(12) United States Patent
Lewin

(10) Patent No.: US 9,586,118 B2
(45) Date of Patent: Mar. 7, 2017

(54) AUTO-INDUCED TACTILE FEEDBACK DEVICE FOR TRAINING SPORTSPERSONS

(71) Applicant: Craig Lewin, Swampscott, MA (US)

(72) Inventor: Craig Lewin, Swampscott, MA (US)

(73) Assignee: Craig Lewin

( * ) Notice: Subject to any disclaimer, the term of this patent is extended or adjusted under 35 U.S.C. 154(b) by 267 days.

(21) Appl. No.: 13/851,686

(22) Filed: Mar. 27, 2013

(65) Prior Publication Data

US 2014/0212858 A1    Jul. 31, 2014

Related U.S. Application Data

(60) Provisional application No. 61/616,624, filed on Mar. 28, 2012.

(51) Int. Cl.
| | |
|---|---|
| *A63B 33/00* | (2006.01) |
| *A63B 69/12* | (2006.01) |
| *G09B 19/00* | (2006.01) |
| *A63B 24/00* | (2006.01) |
| *A63B 71/06* | (2006.01) |
| *A63F 13/24* | (2014.01) |

(52) U.S. Cl.
CPC .............. *A63B 69/12* (2013.01); *A63B 33/00* (2013.01); *G09B 19/003* (2013.01); *G09B 19/0038* (2013.01); *A63B 24/0003* (2013.01); *A63B 33/002* (2013.01); *A63B 2071/0602* (2013.01); *A63B 2071/0655* (2013.01); *A63B 2208/12* (2013.01); *A63B 2210/50* (2013.01); *A63B 2225/09* (2013.01); *A63F 13/24* (2014.09)

(58) Field of Classification Search
CPC ................................ A63B 69/12; A63B 33/00
USPC ................................ 434/254; 606/237; 2/425
See application file for complete search history.

(56) References Cited

U.S. PATENT DOCUMENTS

| | | | | |
|---|---|---|---|---|
| 1,431,011 A | * | 10/1922 | Kratz | 441/81 |
| 3,978,527 A | * | 9/1976 | Bednar | 2/68 |
| 4,279,039 A | * | 7/1981 | Drew | 2/428 |

* cited by examiner

*Primary Examiner* — Nikolai A Gishnock
*Assistant Examiner* — Jennifer L Korb
(74) *Attorney, Agent, or Firm* — Noah Sacks

(57) ABSTRACT

The invention provides a training aide for swimmers and sportsperson. The device includes a tail piece which extends from a head support. The tail piece is aligned so that it will contact with the body, so as to provide feedback to the wearer when their head has moved and is not properly aligned. The tailpiece may be aligned so that raising the head causes the tailpiece to press against the back of the neck or shoulders. The head support may be integrated into the strap of swimming goggles, or have a separate head strap suited for holding the training device.

1 Claim, 30 Drawing Sheets

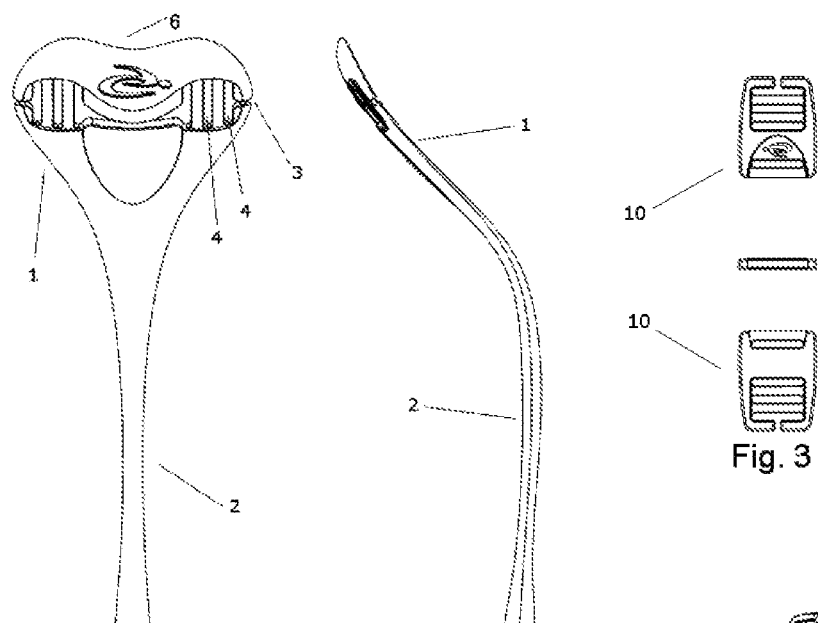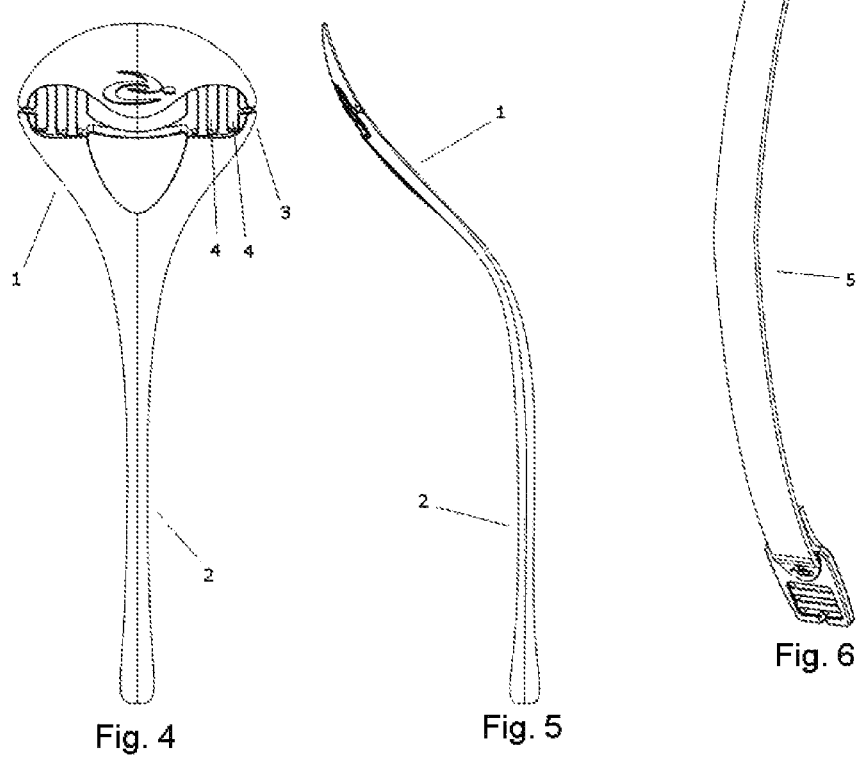

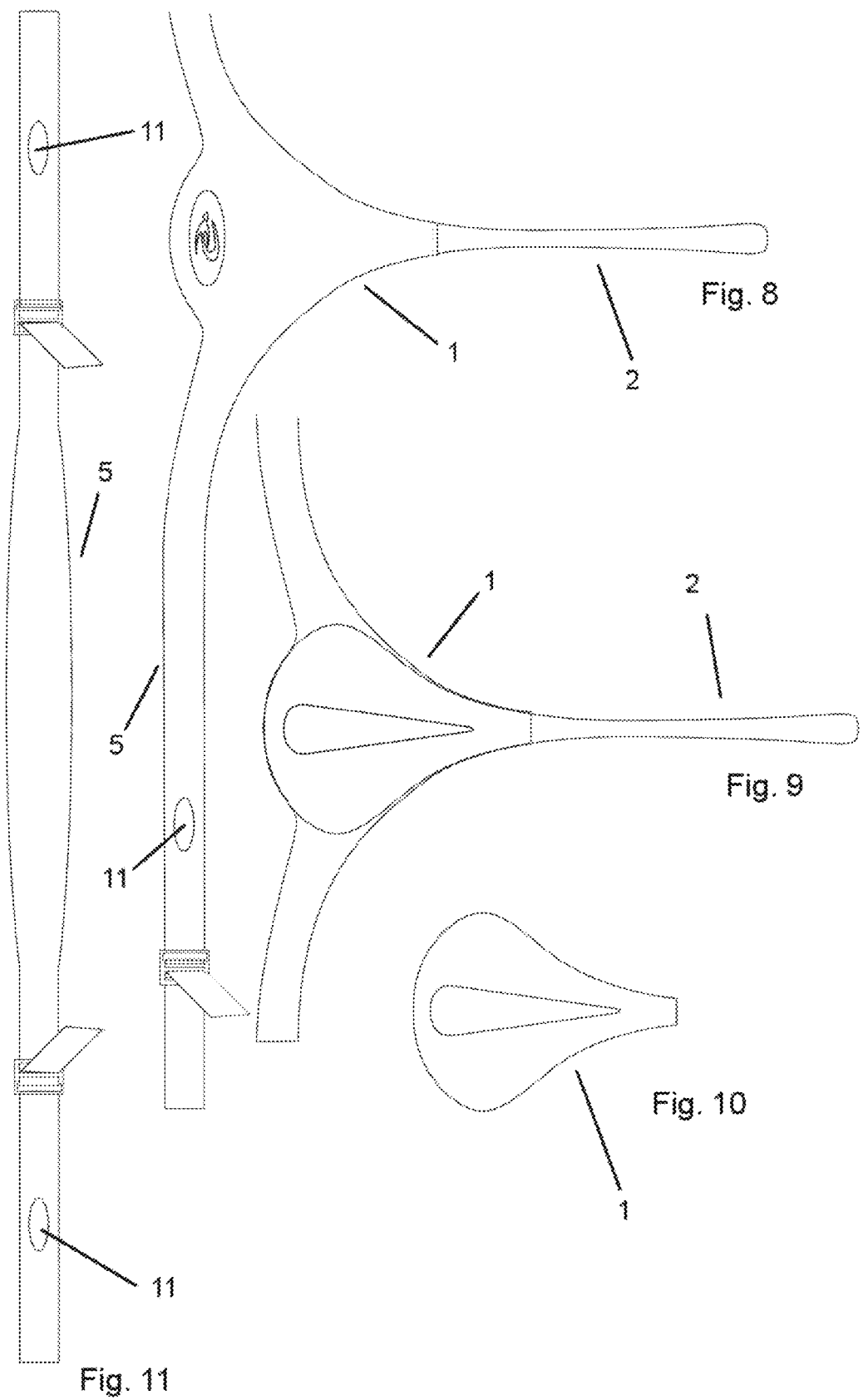

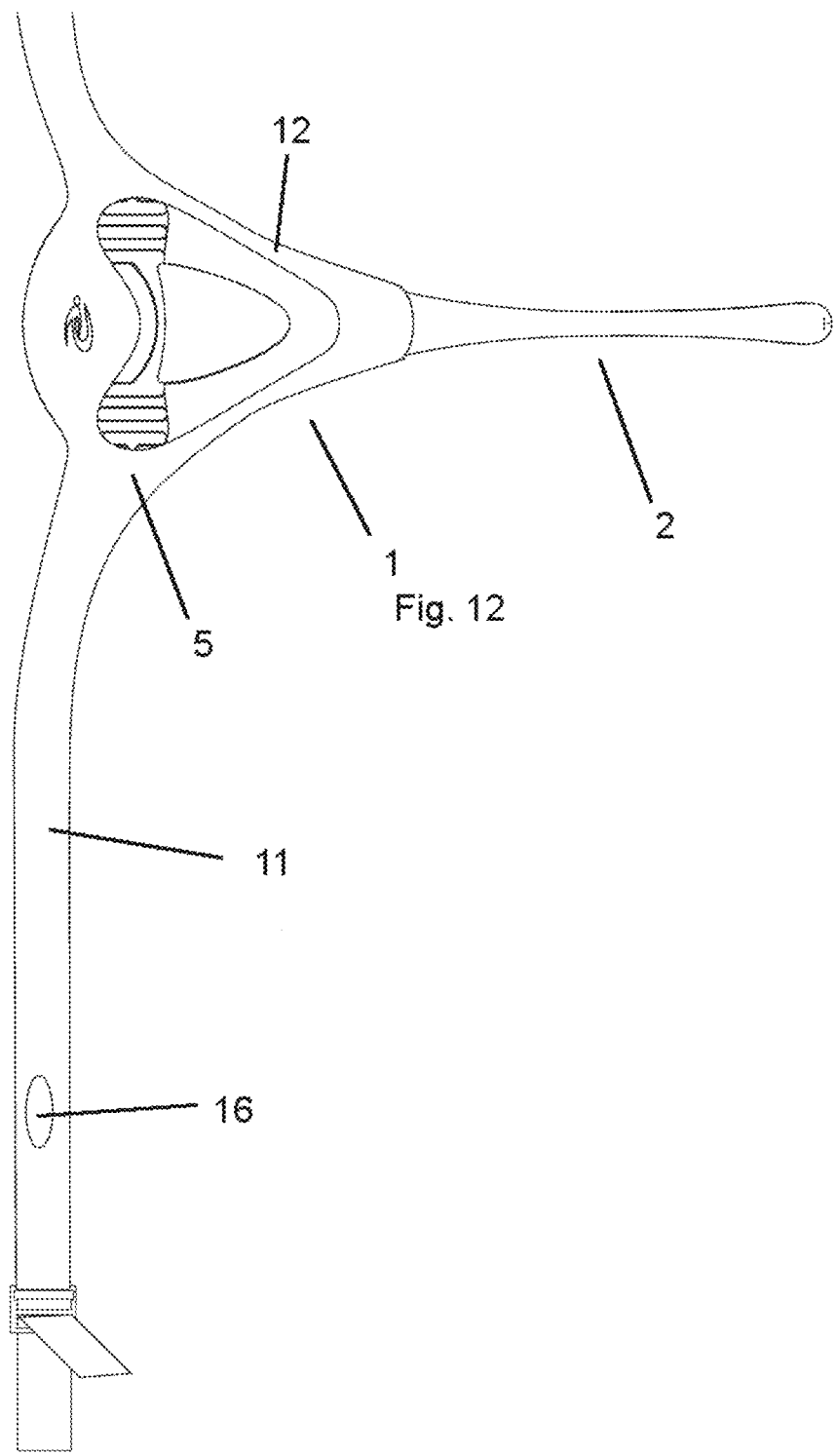

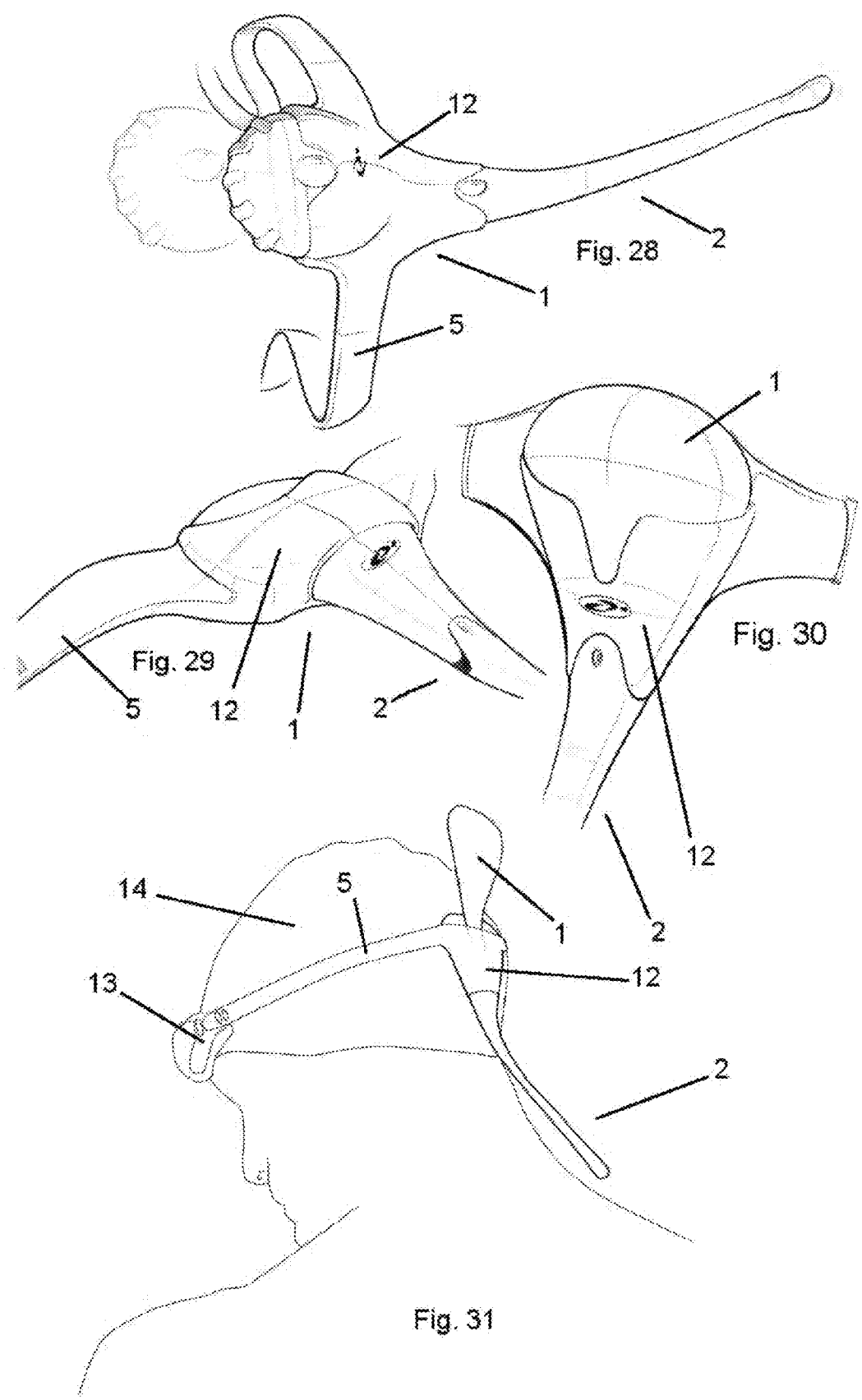

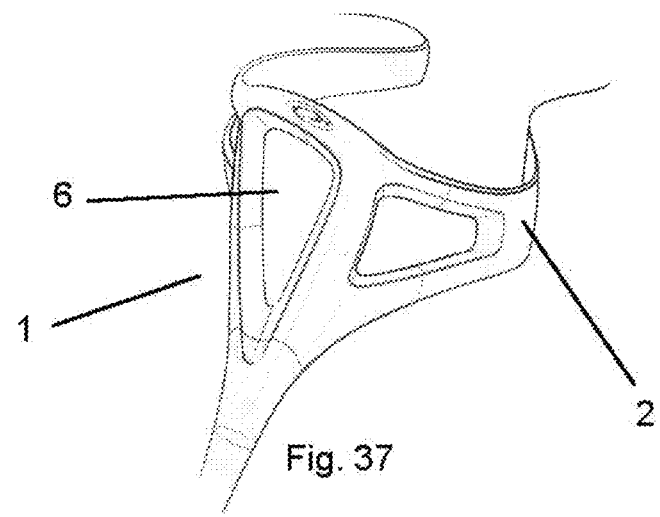
Fig. 37
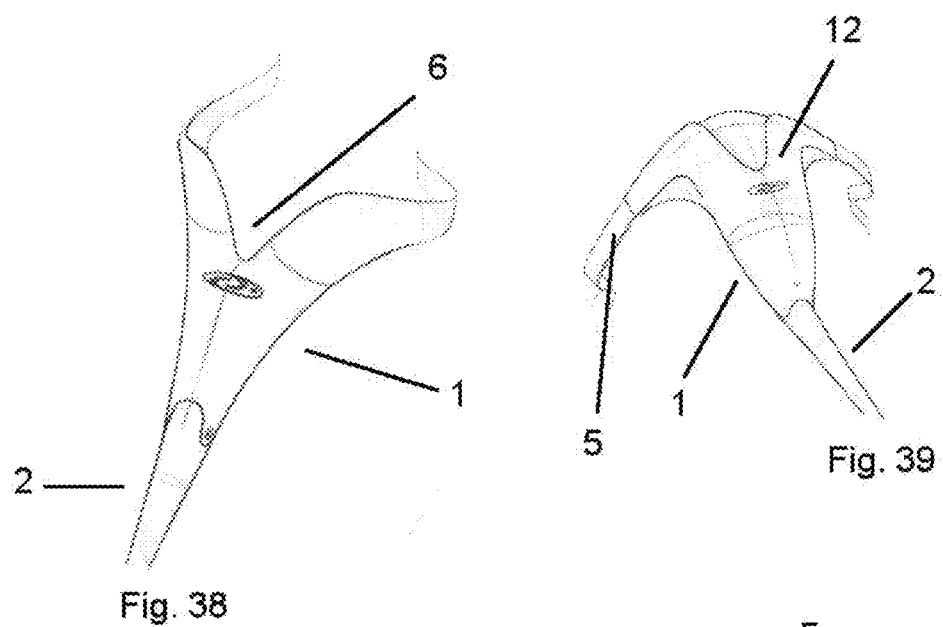
Fig. 38
Fig. 39
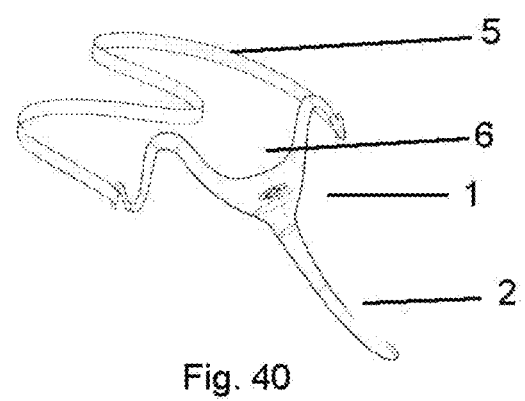
Fig. 40

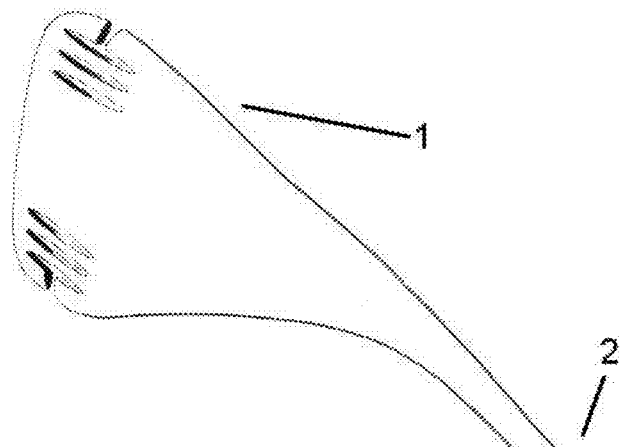
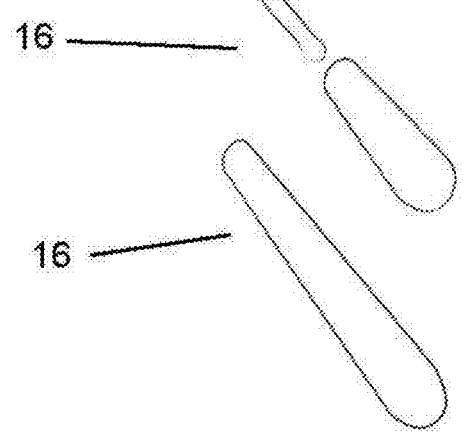
Fig. 50
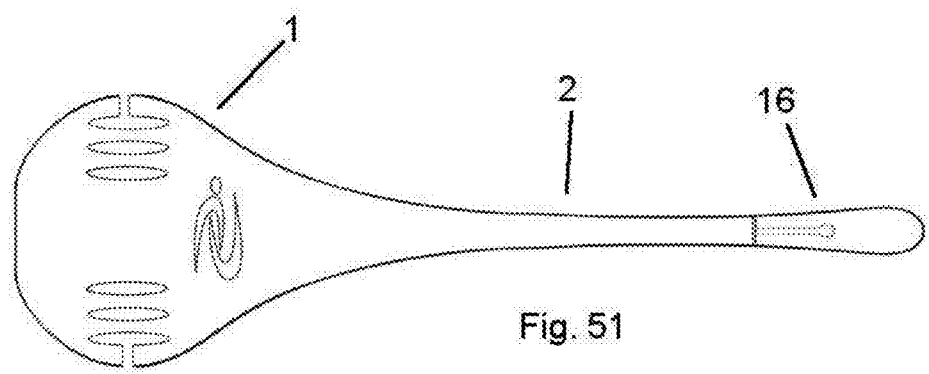
Fig. 51

AUTO-INDUCED TACTILE FEEDBACK DEVICE FOR TRAINING SPORTSPERSONS

CROSS-REFERENCE TO RELATED APPLICATION

This application claims the benefit of U.S. Provisional Application No. 61/616,624, filed Mar. 28, 2012.

FIELD OF THE INVENTION

The present invention relates to the sports field such as swimming or golfing, and in particular it relates to a device for use by a sportsperson to practice correct posture while performing a succession of body movements.

BACKGROUND OF THE INVENTION

The movement that a swimmer executes while swimming is called a "stroke", a variety of strokes exist which require the coordination of multiple body parts in a rhythmic fusion. Similarly the series of movement a golfer executes to strike a golf ball is called a "swing" and a compound of body movement's results in a successful shot.

The compound of coordination required for a stroke or a swing is complicated by an individual's habits and athletic ability.

A stroke can be seen as a succession of positions and actions. For strokes such as the front crawl, butterfly and the breast stroke there is an optimal succession of movements which result in the most efficient performance of the stroke. One critical component for performing these strokes is the posture of the head and neck while swimming. The swimmer needs to keep their head down, which in turn forces their hips up, allowing a more hydrodynamic and efficient stroke. Swimmers have a tendency to lift their heads in the water, without realizing it forces their hips down, creating increased drag. With a head up posture, their stroke will no longer be optimal and their efficiency will suffer.

Various training aids exist for improving performance while swimming. There are a variety of hand paddles, kick boards, stretch cords, and drag chutes available for training.

Other equipment used by sportspersons for practice comprises sophisticated and expensive devices such as sensors which are attached to a person, or use a video camera for checking and adjusting the movement.

However, the above described equipment and other training equipment for sportspersons are not adapted to assist in keeping the head down, achieving the correct posture of the head and neck.

SUMMARY OF THE INVENTION

It is therefore a feature of the present invention to provide a training device to assist in correct posture of the head and neck for sportspersons.

It is another feature of the present invention to provide a training device that is safe to use in the event that a swimmer becomes panicked or uneasy.

It is another feature of the invention to provide a training device with a scalloped section which accommodates long hair wrapped in a bun or in a pony tail.

It is another feature of the invention that the scalloped section for the hair bun or pony tail allows the training device to be held in proper head alignment, effectively locking it into place.

It is another feature of the invention, to provide a training device that does not hold the head down, and does not impede the trainee's breathing.

It is a particular feature of the present invention to provide alignment and proper registration of the training device on the sportsperson's head.

It is another feature of the invention to provide a training device with a pocket and strap which the tailpiece is inserted into the pocket.

It is another feature of the invention to provide a training device that has a tail length appropriate for use by adults, teenagers and children. The difference between neck lengths between adults is within the range of the tailpiece of the invention. Teenagers typically already have developed fully their neck length and may use a training device with the same length of tailpiece as adults. Children, on the other hand, may use the same training device by wearing it further up on the head.

It is another feature of the invention to be made of a material that is safe to use when exposed to chlorine, or does not break into sharp pieces if the tailpiece is broken.

It is another feature of the invention that the training device stays secure when the swimmer is performing a flip turn in the swimming pool.

It is another feature of the invention that the training device may be worn on the front of the head, to give a visual indication when a swimmer's arm is crossing over the centerline.

It is another feature of the invention that the training device has a tailpiece with multiple prongs.

It is another feature of the invention that the training device has a tailpiece with teeth, spikes, ridges, or raised features to provide a more pronounced feeling.

It is another feature of the invention that the training device can be used with a motion tracking device.

It is another feature of the invention that the training device can be used with a motion tracking device, such as a MICROSOFT® KINECT® for the XBOX 360® motion sensing input device.

It is another feature of the invention that the training device can be used with a motion tracking controller, such as the PLAYSTATION® Move motion controller for the SONY P53® motion sensing input device, or the WII® Remote for the NINTENDO WII® motion sensing input device.

It is another feature of the invention that the training device can be used in ballet, running, and archery for correct posture.

It is another feature of the invention that the training device can be used while driving, particularly long distance truck driving.

These and other features are accomplished with an exemplary training device for sportspersons, according to the invention, which is suitable to assist a sportsperson to execute a correct succession of movements, for example a stroke or a swing, said training device comprising a tailpiece, said tailpiece having a head support that is adapted to fit the sportsperson's head. Furthermore, the training device may have a strap having reference points for aligning the device symmetrically on the head that is attached to said head support, wherein the tailpiece extends from the head support a sufficient distance and at an appropriate angle to guide the trainee with respect to an appropriate head and neck posture.

Advantageously, in one embodiment of the invention, the tailpiece comprises an angle with respect to the head support and a length that does not interfere when a swimmer turns their head to breath.

Advantageously, the angle of the tailpiece with respect to the head support comprises at least one angle selected from the group comprised of: a tailpiece angle at angle α that is measured with respect to the center line 7 of the head support 1 and the centerline 8 of the tailpiece; a second tailpiece angle at an angle β with respect to the centerline 8 of the tailpiece and reference line 9 of the tailpiece with a 140° of α angle.

However, it is also possible that the training device, according to the invention, has a tailpiece with 0 degrees of angle in the second tailpiece angle, as above described.

Advantageously, the first angle of the tailpiece is at said angle α with respect to a centerline line 7 of the head support.

In particular, said angle α can be between 45° and 270°, advantageously between 90° and 180°, advantageously between 100° and 170°, advantageously between 120° and 150°, and advantageously between 137° and 140°.

The training device of the invention may be made with any material, most preferably a plastic that is resistant to chlorine. Plastics that may be used with the training device include but are not limited to: polyester, polyethylene terephthalate, polyethylene, high-density polyethylene, polyvinyl chloride, polyvinylidene chloride, low-density polyethylene, polypropylene, polystyrene, high impact polystyrene, polyamides, acrylonitrile butadiene styrene, polycarbonate, polycarbonate/acrylonitrile butadiene styrene, polyurethanes, melamine formaldehyde, plastarch material, phenolics or phenol formaldehydes, polyetheretherketone, polyetherimide, polylactic acid, polymethyl methacrylate, polytetrafluoroethylene, and urea-formaldehyde.

Advantageously the training device is in one variation about 6.770 inches long from the tip of the tail to the top of the head support and 2.372 inches wide at the widest part of the head support. Advantageously the training device has a ratio of the length of the device to the width of the head support of about 1:1 to about 10:1, advantageously from about 1:1 to about 9:1, advantageously from about 1:1 to about 8:1, advantageously from about 1:1 to about 7:1, advantageously from about 1:1 to about 6:1, advantageously from about 1:1 to about 5:1, advantageously from about 1:1 to about 4:1, advantageously from about 1:1 to about 3:1, advantageously from 1:1 to 2.5:1, advantageously from about 1:1 to about 2:1, advantageously from about 1:1 to about 0.1:1, advantageously from about 2:1 to about 3:1, and most preferably about 2.854:1.

BRIEF DESCRIPTION OF THE DRAWINGS

The invention will be now shown with the following description of an exemplary embodiment thereof, exemplifying but not limitative, with reference to the attached drawings in which:

FIG. 1 shows a top plan view of an exemplary embodiment of the training device for sportspersons, according to the invention;

FIG. 2 shows a side view of a training device as in FIG. 1 for sportspersons;

FIG. 3 shows the buckles of the strap as shown in FIG. 6;

FIG. 4 shows a top view of the training device without the scalloped portion to accommodate a hair bun or pony tail;

FIG. 5 shows a side view of a training device as in FIG. 4;

FIG. 6 shows a head strap for use with the head support and tailpiece according to the invention;

FIG. 8 shows the dorsal side of a training device;

FIG. 9 shows the ventral side of a training device of the invention, as in FIG. 8;

FIG. 10 shows a head support portion of a training device of the invention;

FIG. 11 shows an adjustable strap of the invention;

FIG. 12 shows a training device of the invention;

Figure 19:
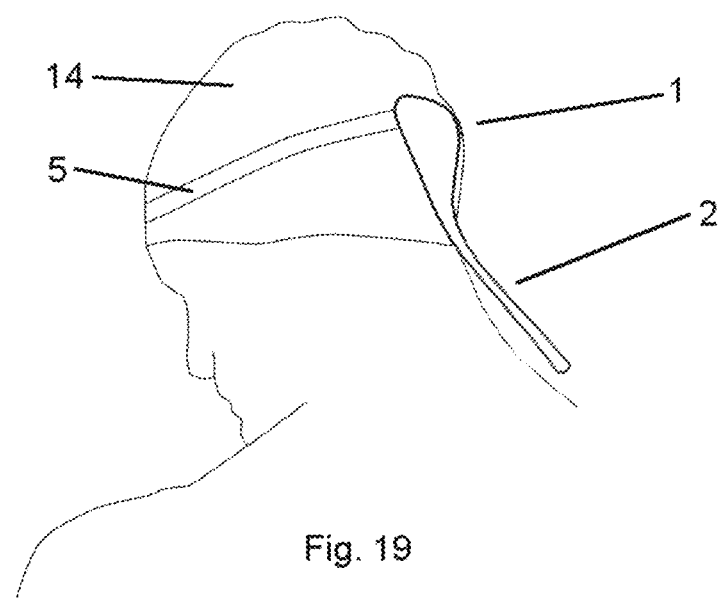
Figure 20:
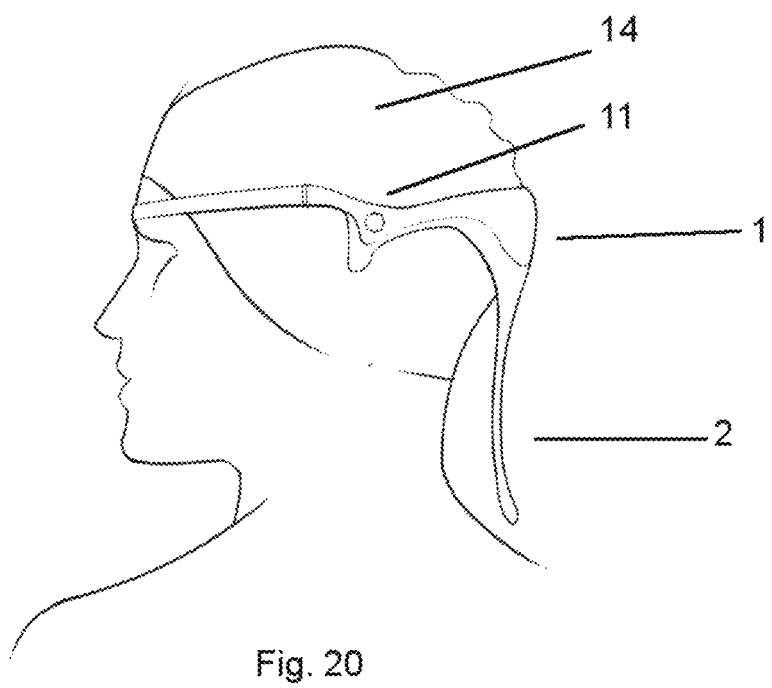
Figure 21:
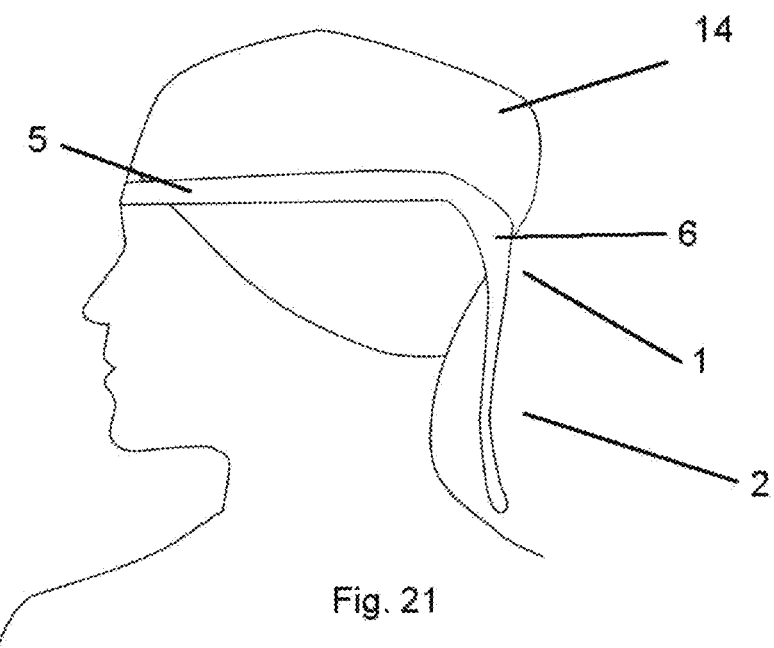
Figure 22:
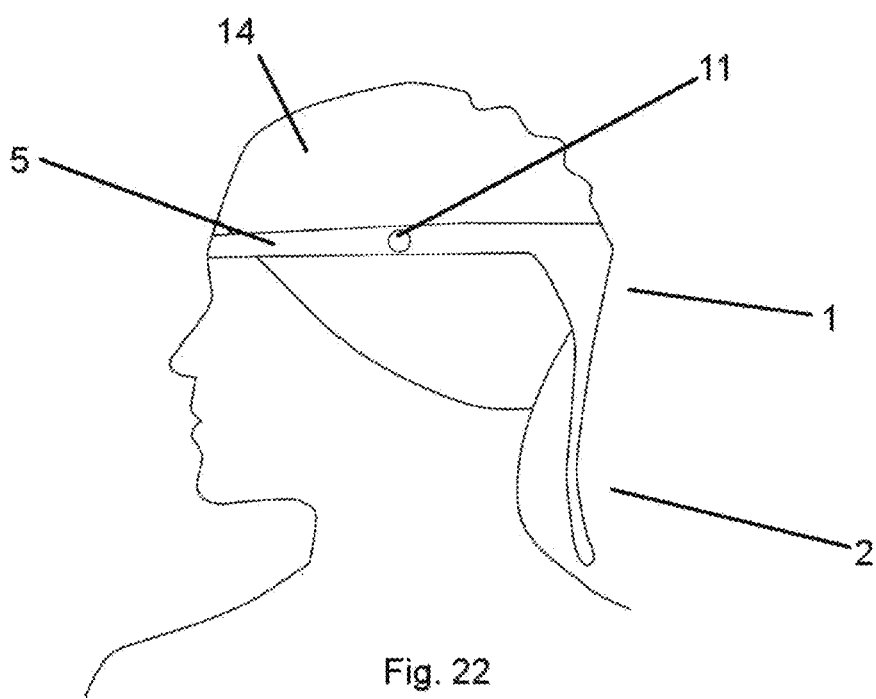
Figure 23:
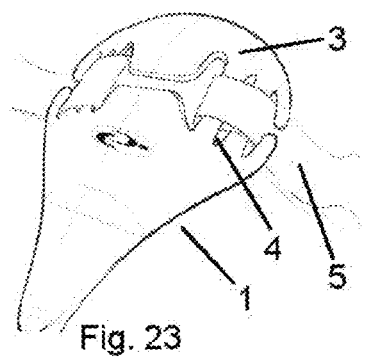
Figure 24:
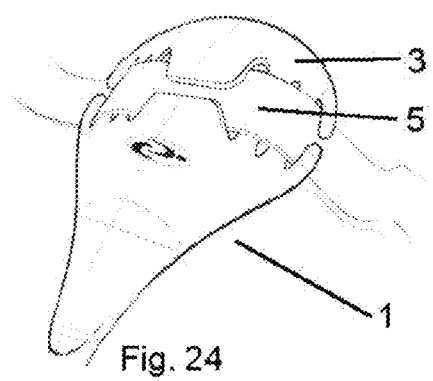
Figure 25:
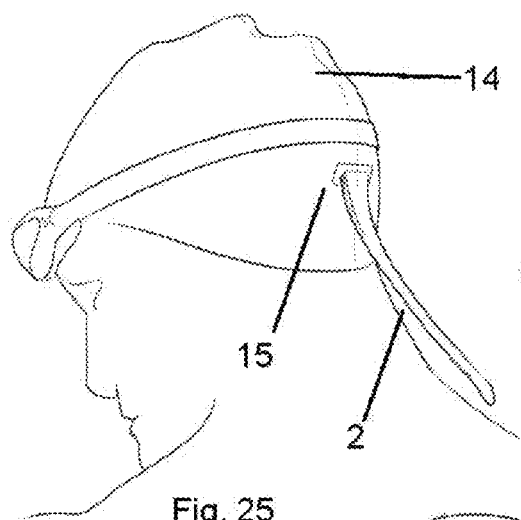
Figure 26:
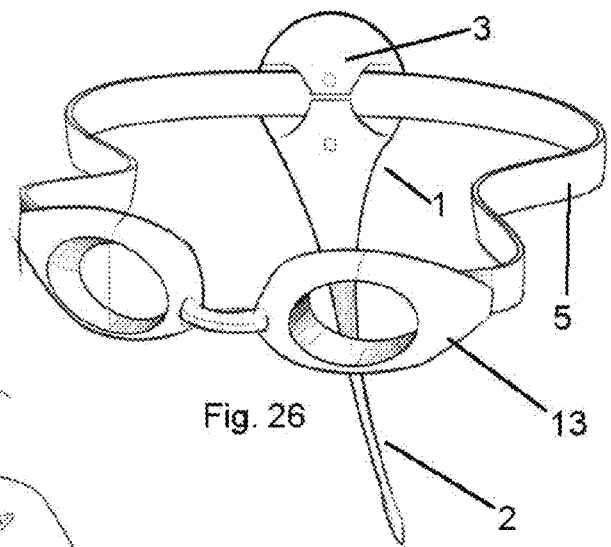
Figure 27:
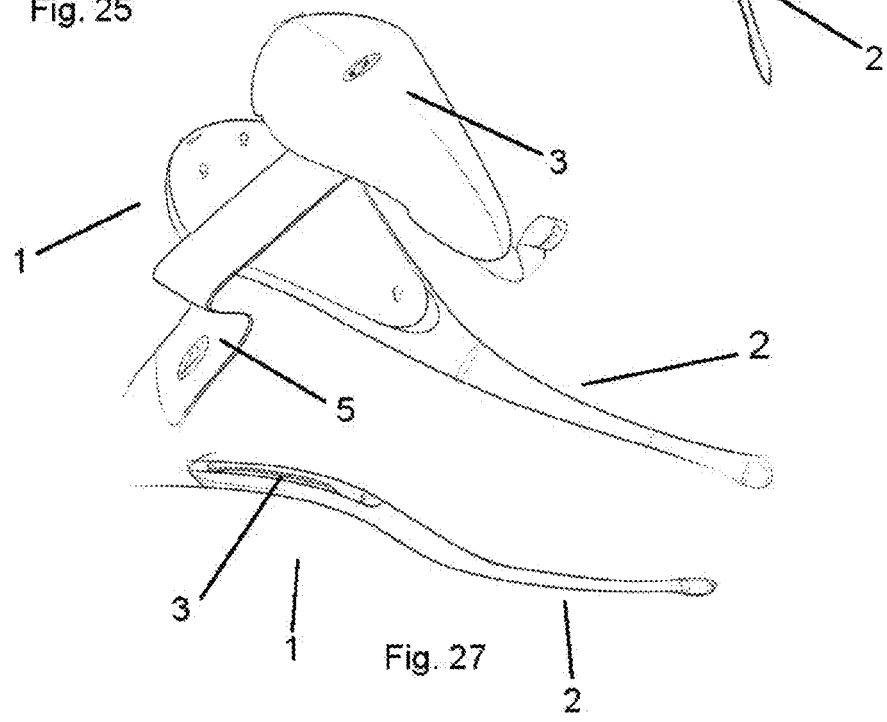
Figure 32:
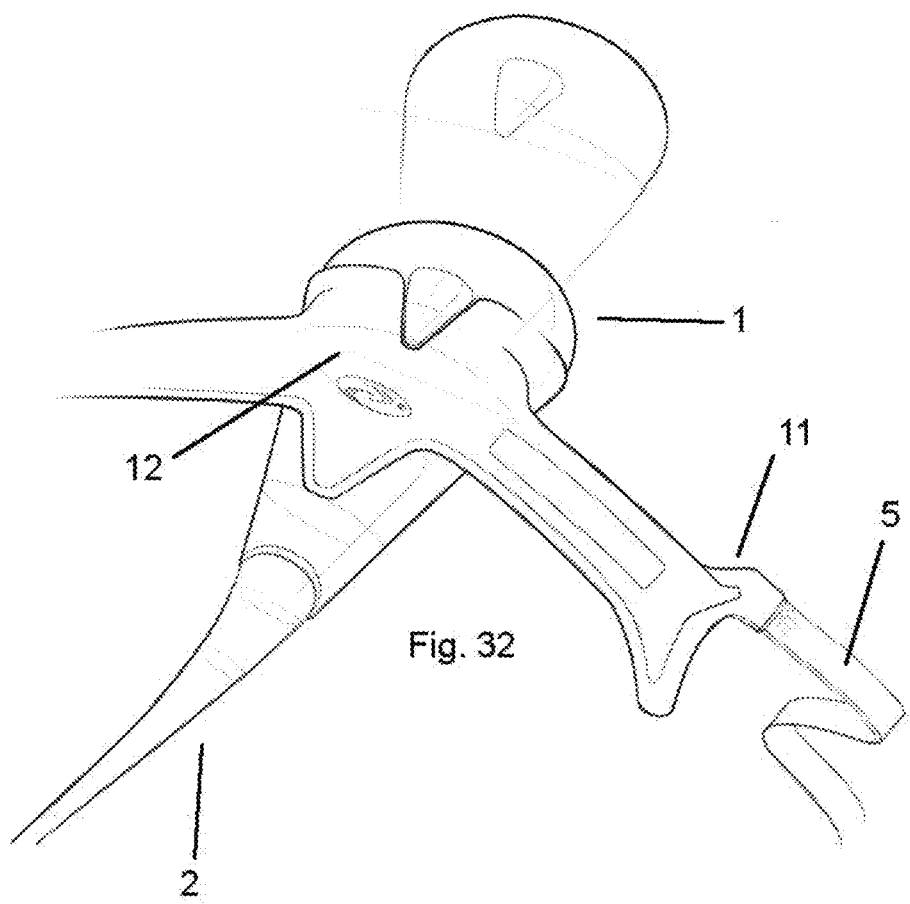
Figure 33:
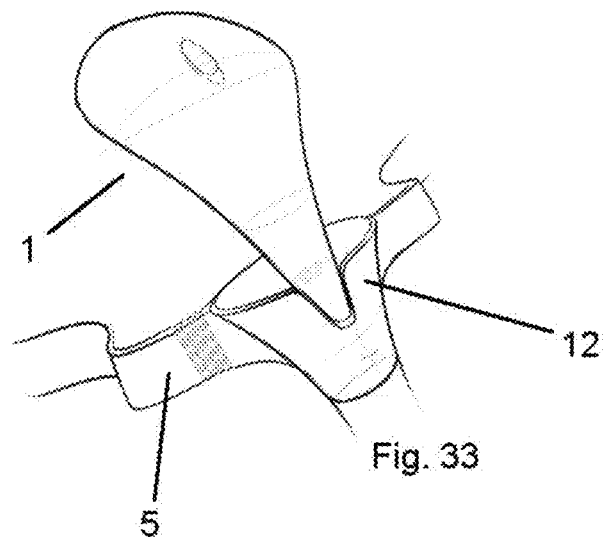
Figure 34:
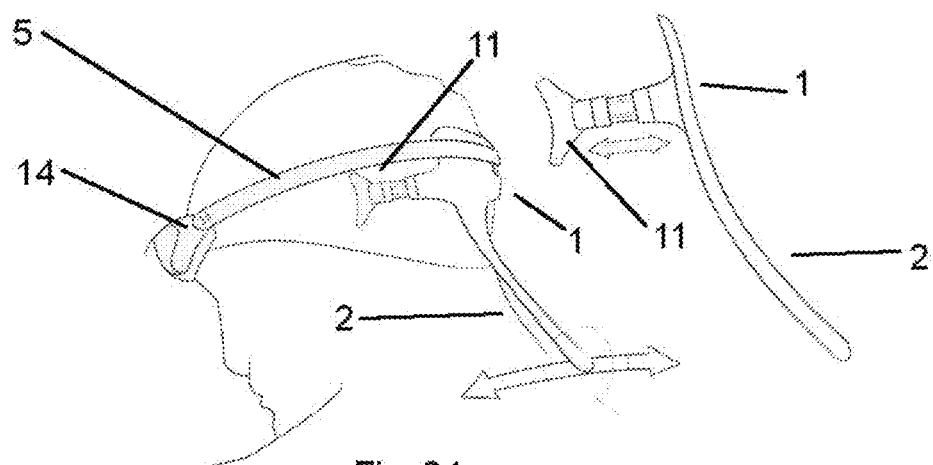
Figure 35:
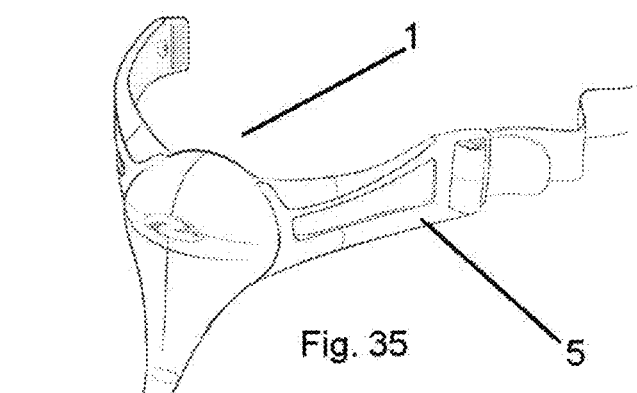
Figure 36:
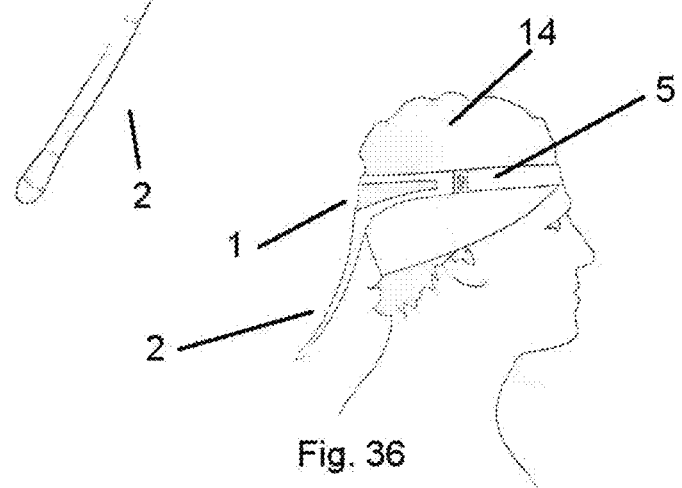
Figure 41:
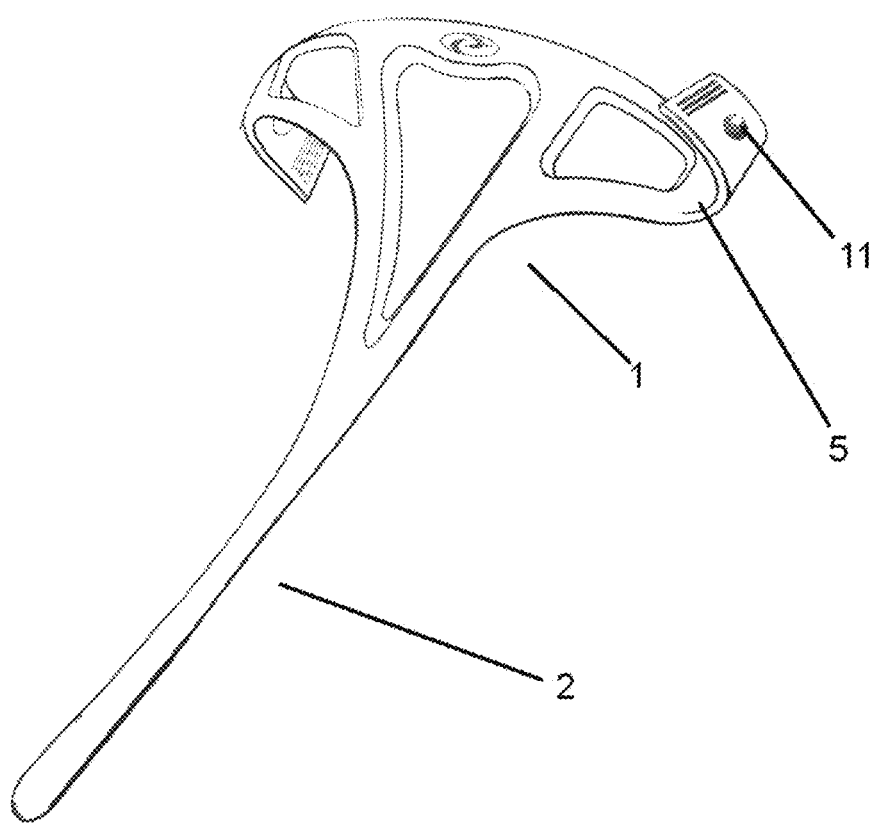
Figure 42:
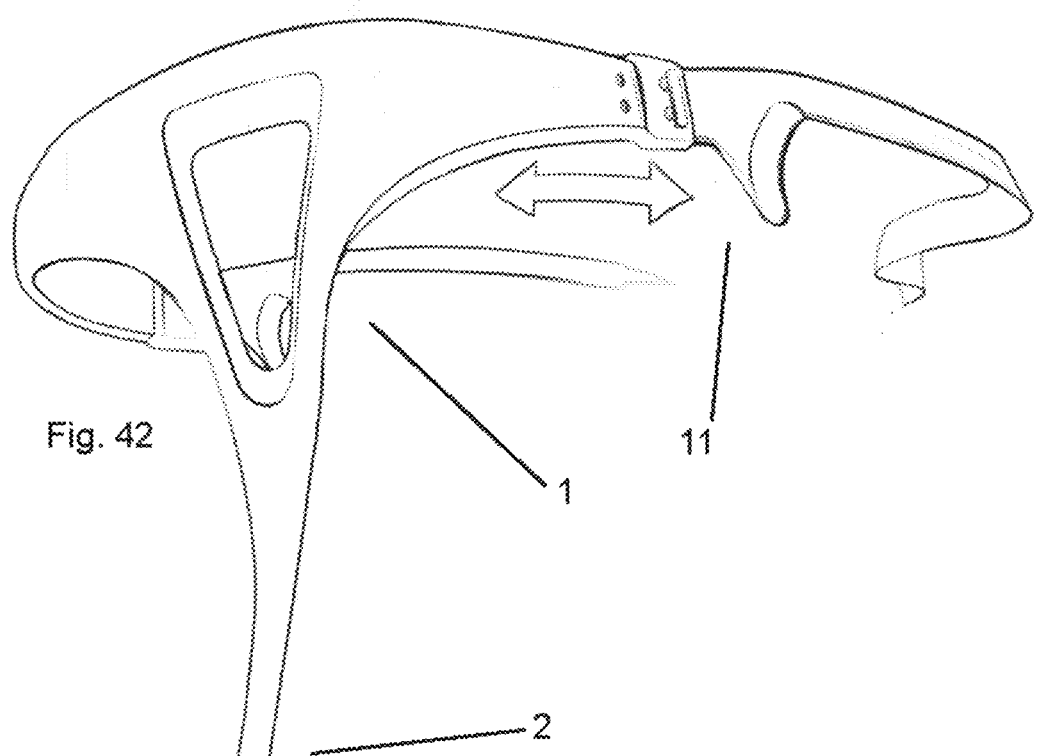
Figure 43:
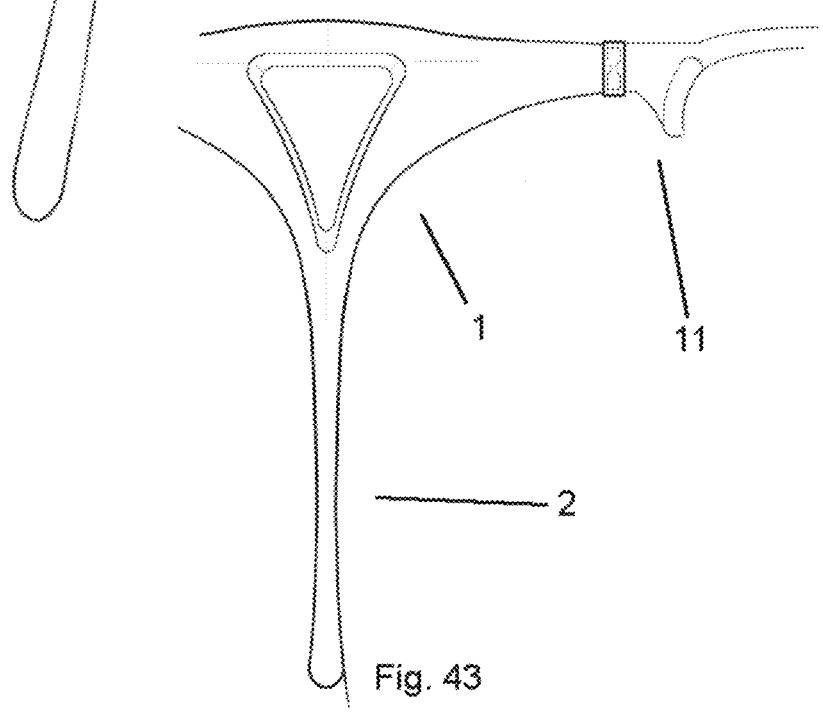
Figure 44:
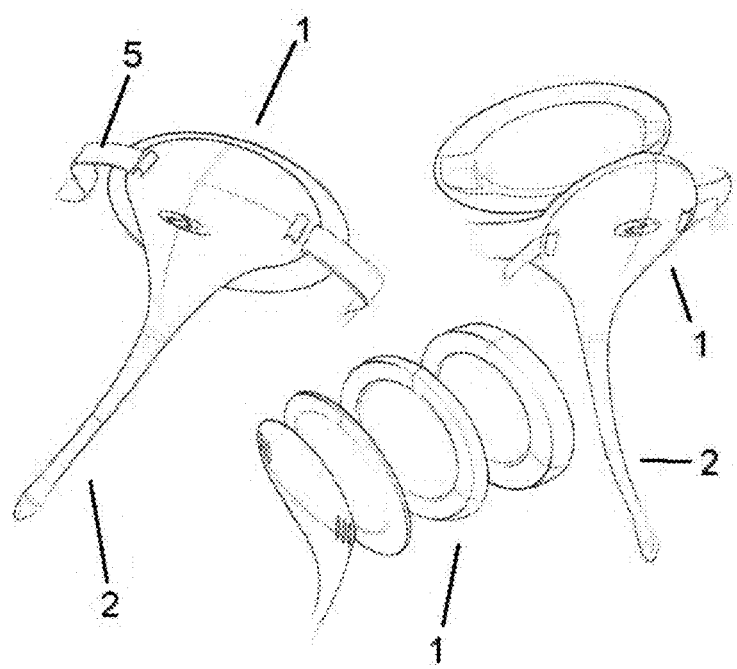
Figure 45:
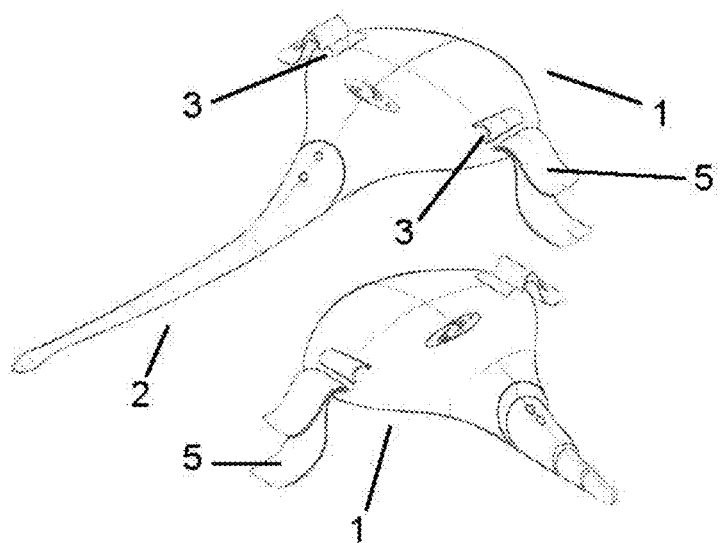
Figure 46:
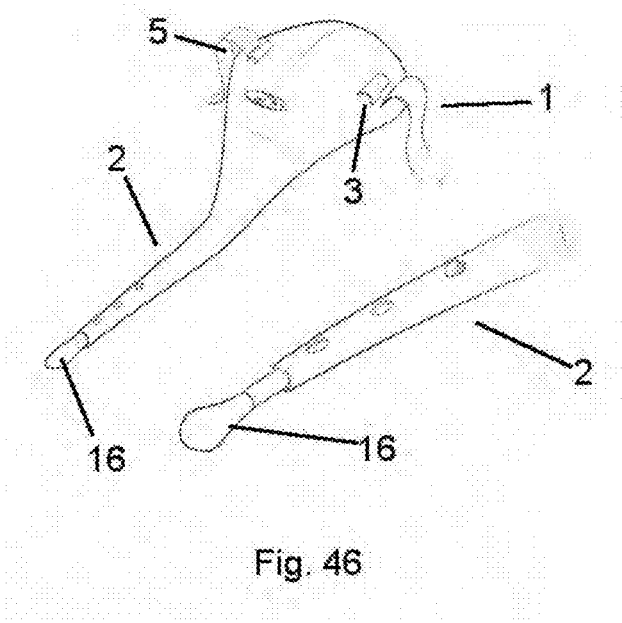
Figure 47:
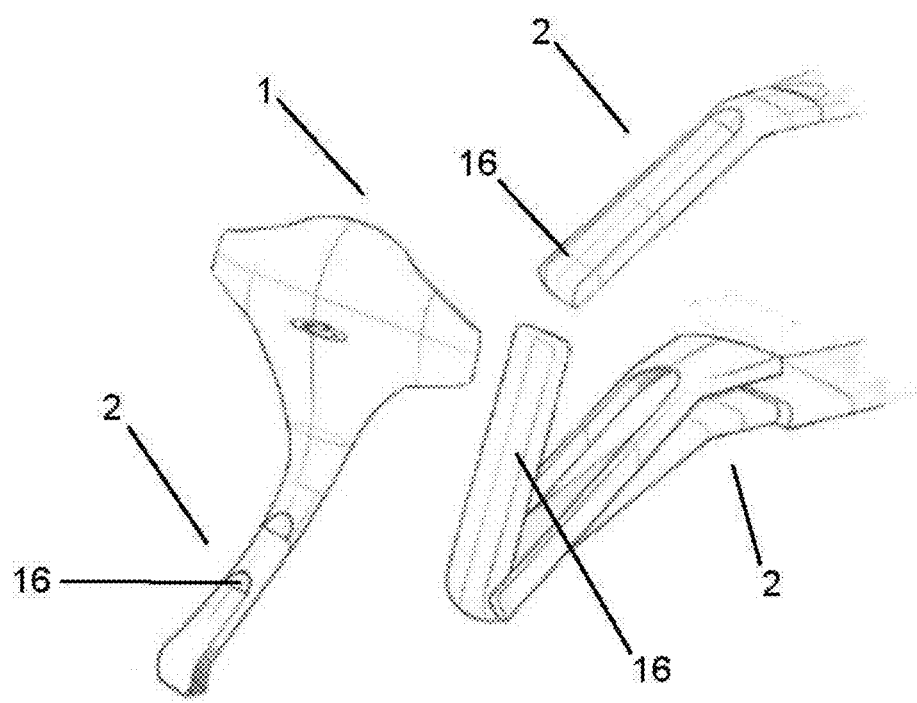
Figure 48:
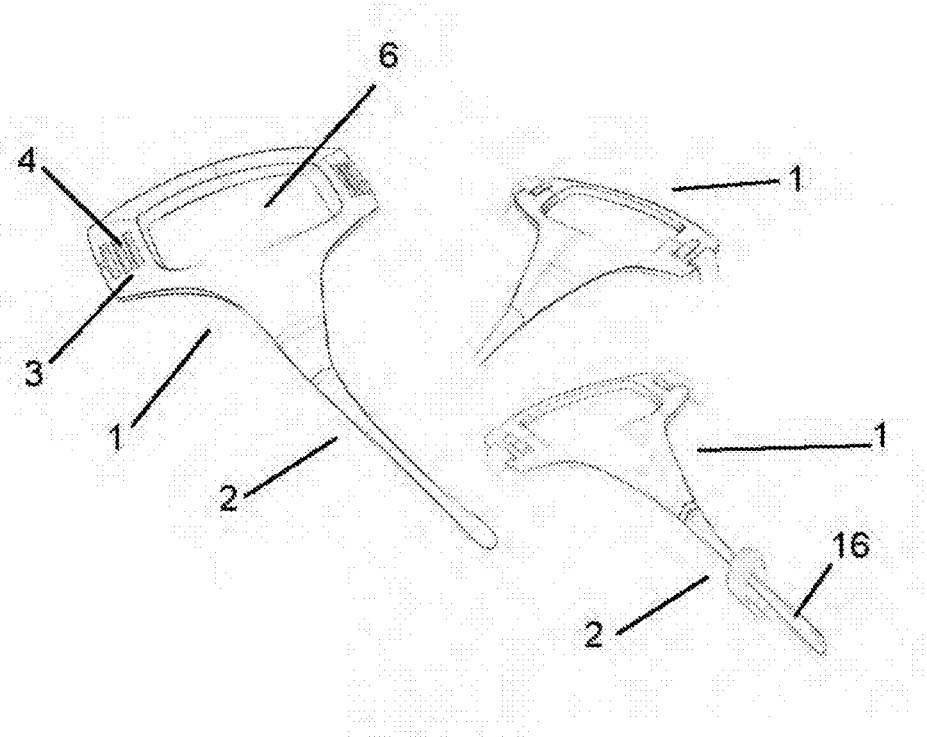
Figure 49:
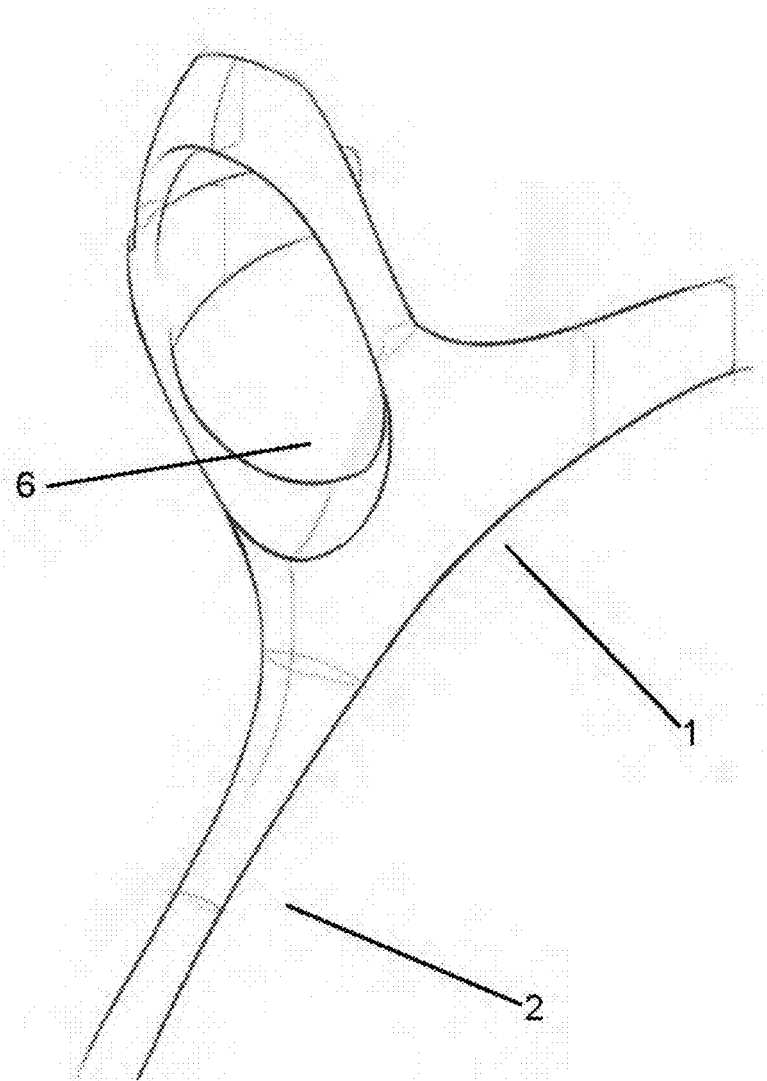
Figure 52:
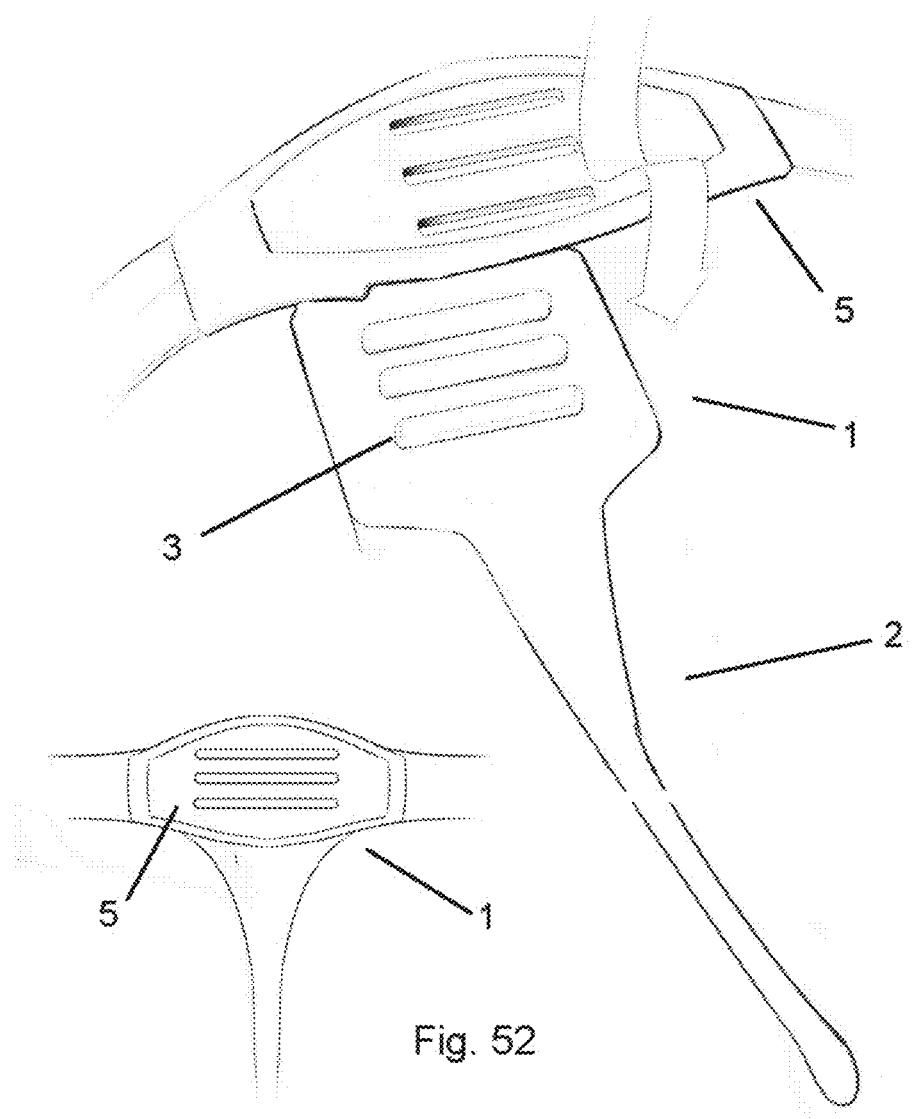
Figure 53:
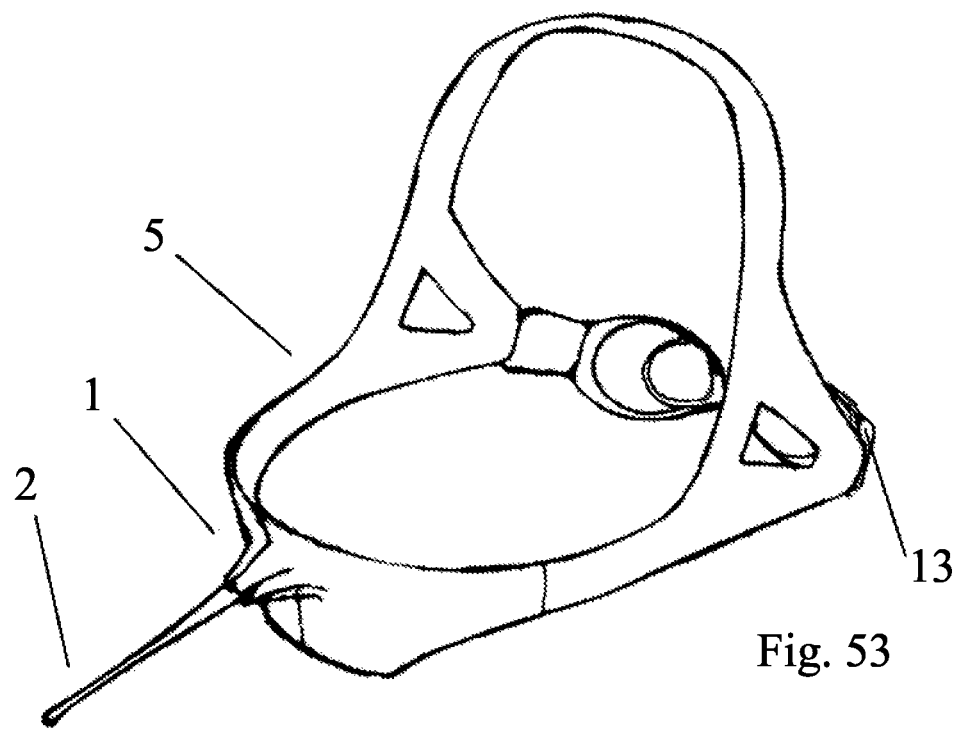
Figure 54:
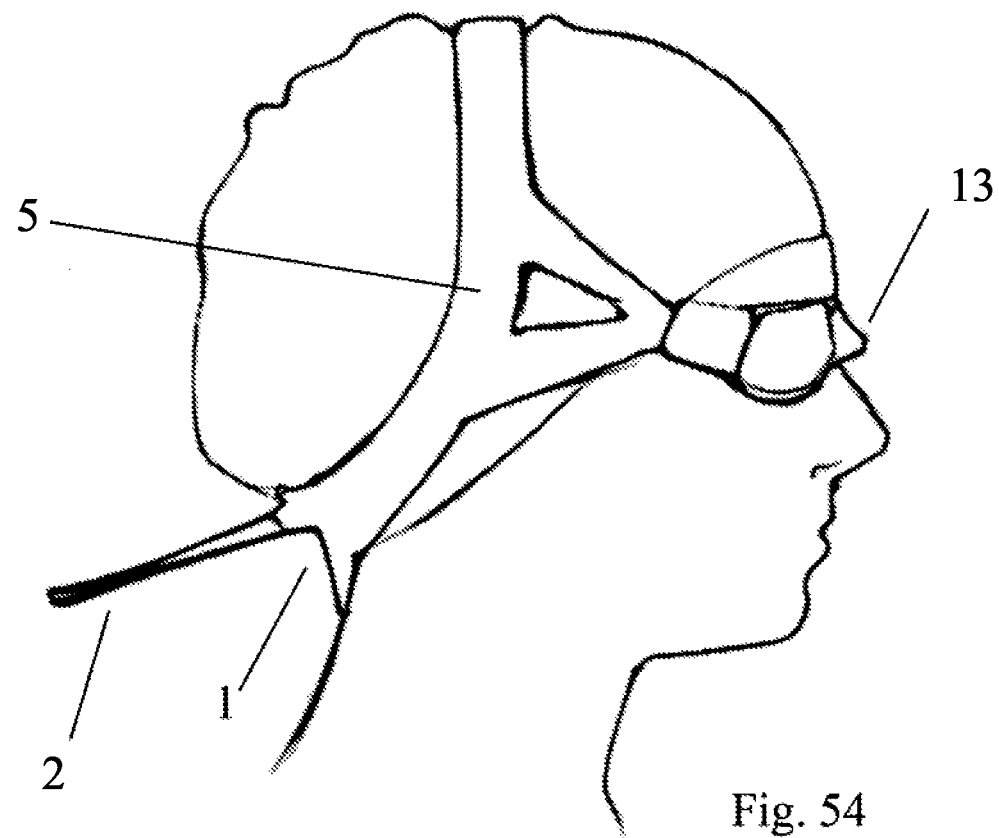
Figure 55:
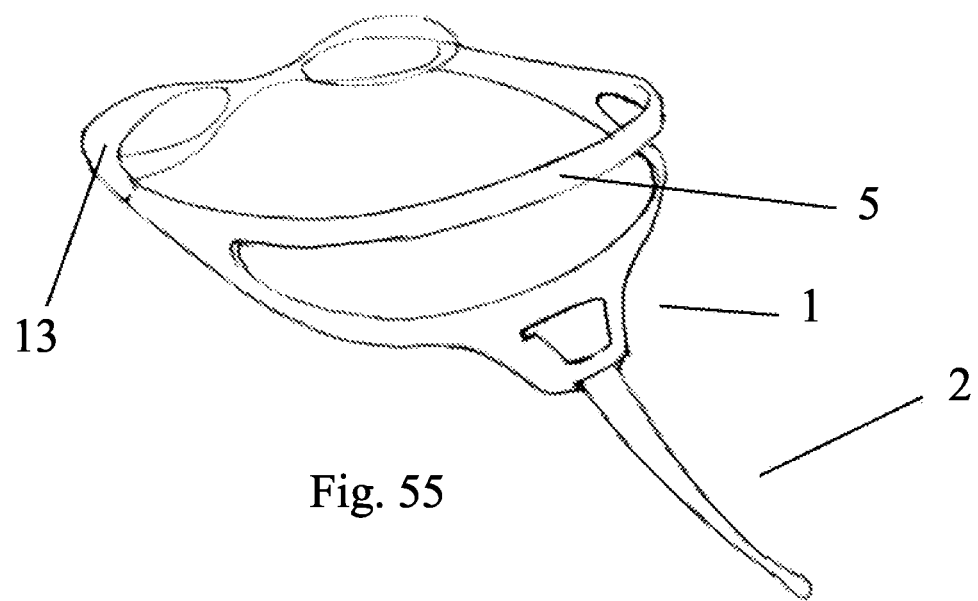
Figure 56:
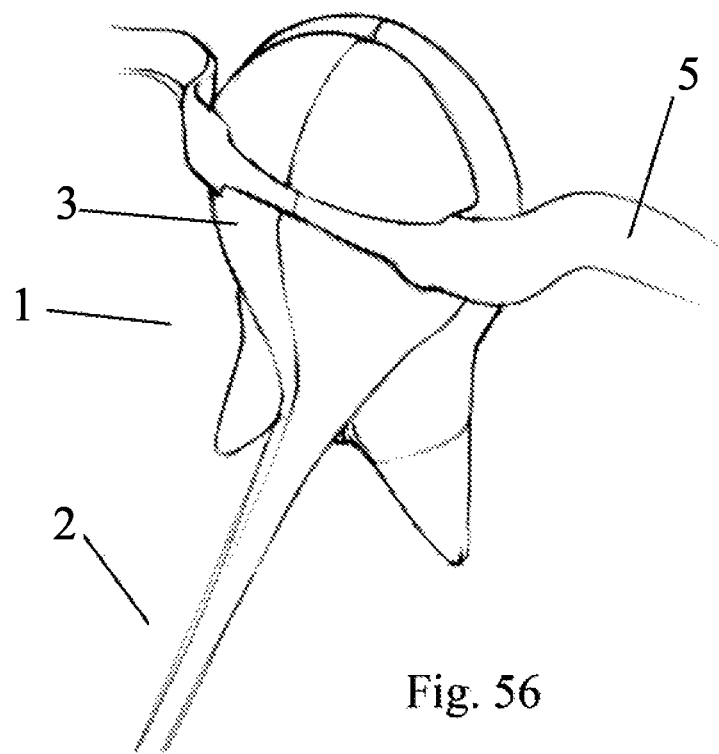
Figure 57:
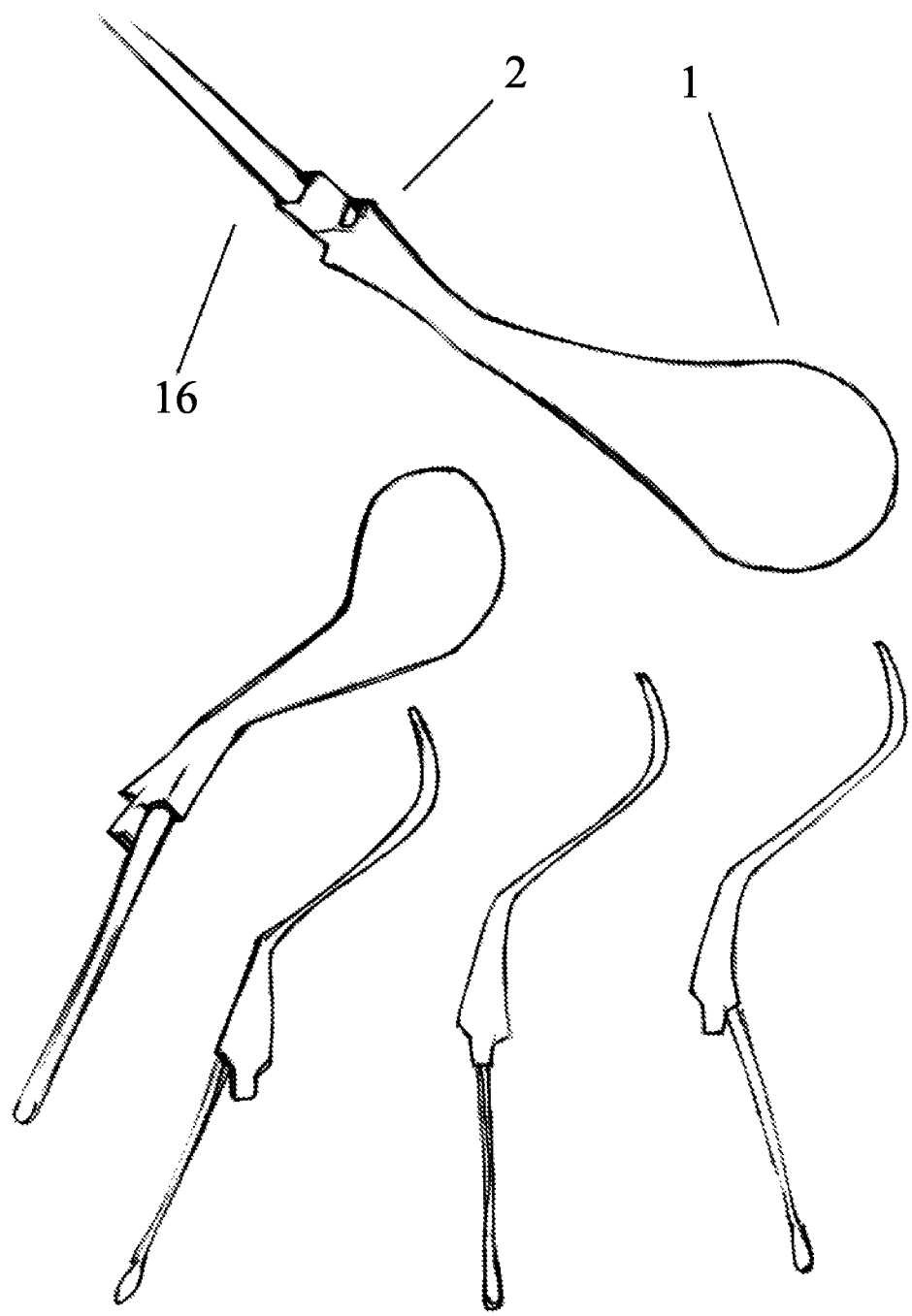
Figure 58:
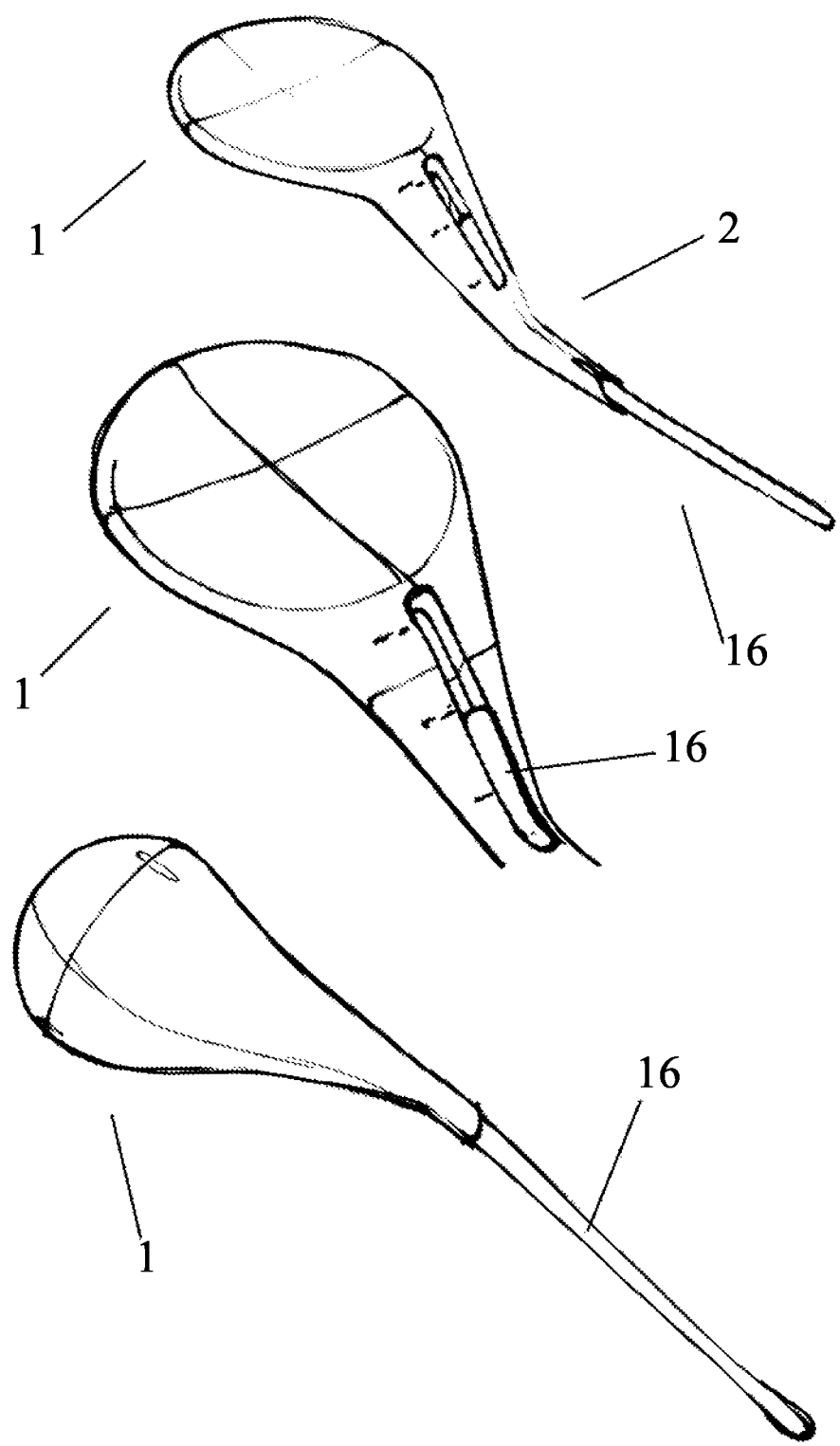
Figure 59:
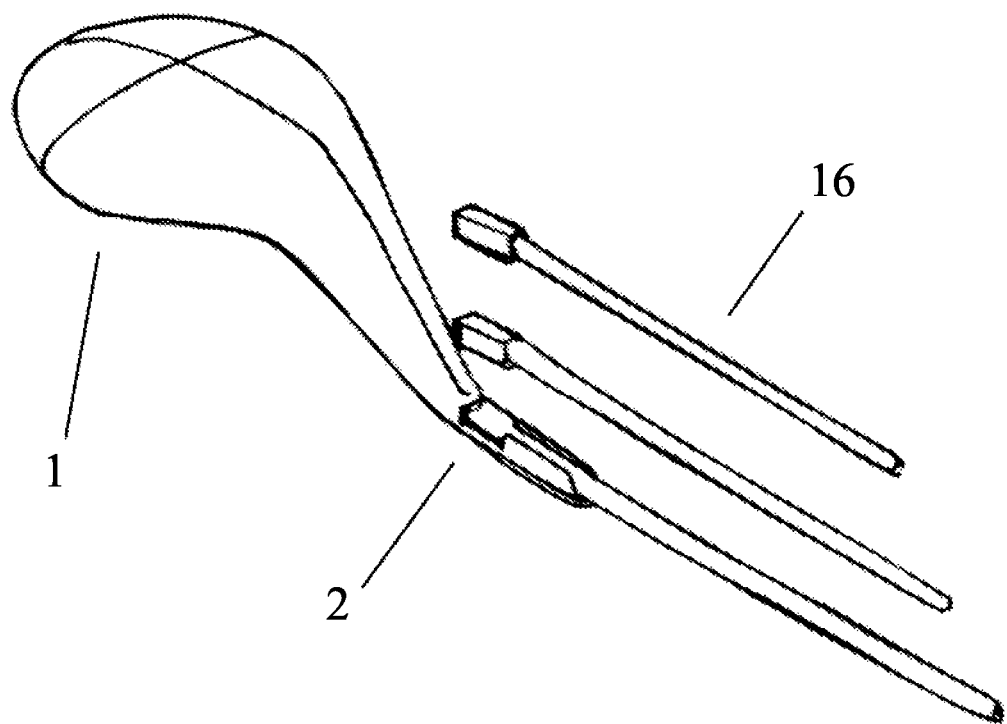
Figure 60:
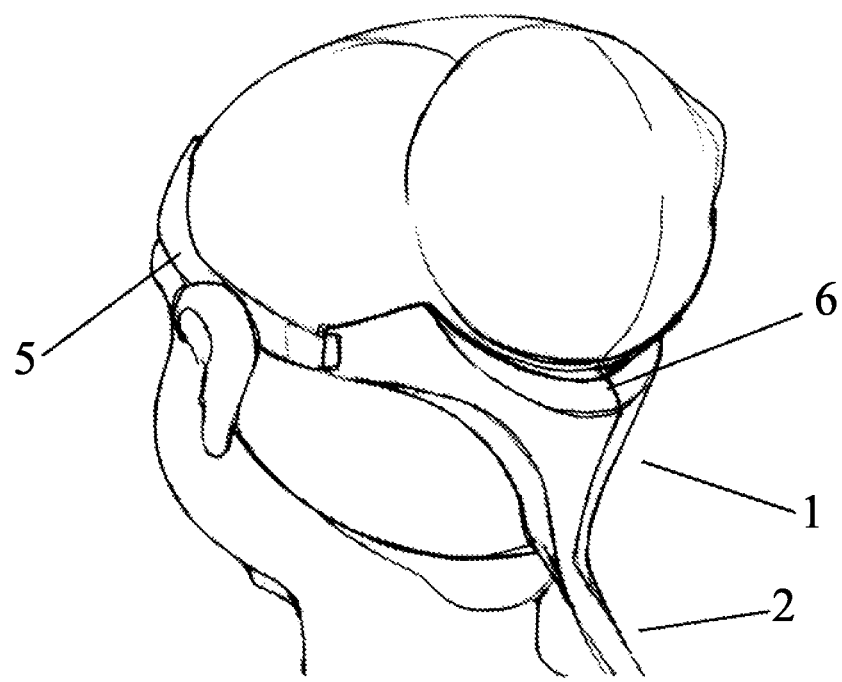
Figure 61:
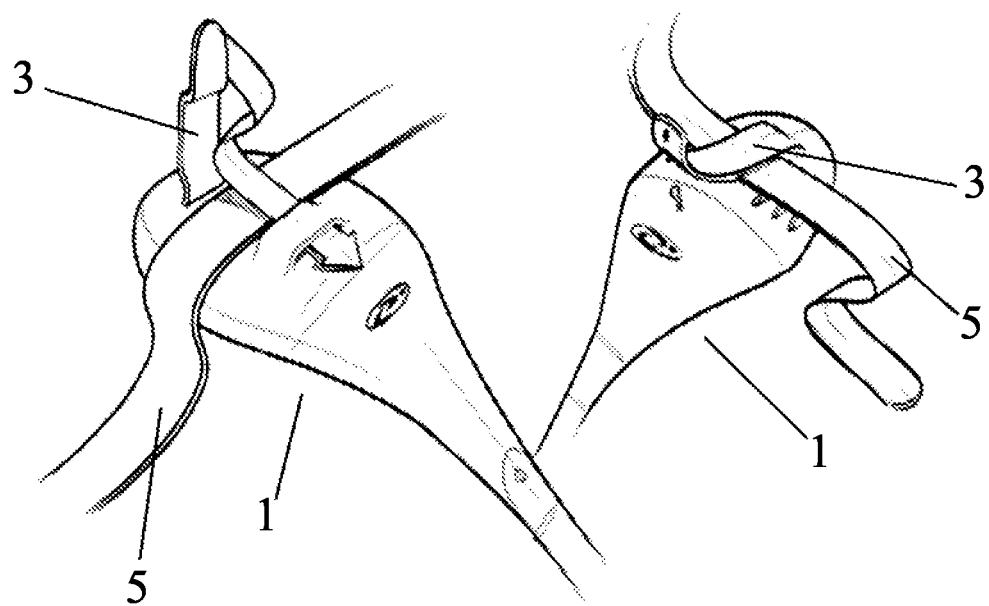

FIGS. from 15 to 18 show a training device in different arrangements that a sportsperson may use of the invention;

FIG. 19 shows a perspective view of a sportsperson wearing a training device according to the invention;

FIGS. 20 to 22 show a sportsperson with variations of the training device as worn when using the training device;

FIG. 23 shows how a strap may be looped or weaved through the head support of a training device;

FIG. 24 shows a perspective view from behind of a sportsperson wearing a training device through an opening in a swimming cap;

FIG. 25 shows a training device co-mounted on the same strap as a pair of goggles;

FIG. 26 shows a training device with two halves for securing a head strap;

FIG. 27 shows a head strap secured to the head support piece of a training device;

FIGS. 28 to 30 show variations of a training device according to the invention;

FIG. 31 shows a sportsperson in perspective with a head support and tailpiece inserted into a head strap with a pouch;

FIG. 32 is a training device with a pocket for the head support and side to side head registration pieces;

FIG. 33 is a training device as in FIG. 32 with detail showing the training device being inserted into the pocket;

FIG. 34 shows a head support with adjustable side support pieces;

FIG. 35 shows a training device with increased support for the head support piece;

FIG. 36 shows a training device with support for the head support;

FIG. 37 shows a training device with an opening through the head support;

FIG. 38 shows a training device with an angled "V" shaped opening;

FIG. 39 shows a training device according to the invention with an elongated pocket and head support;

FIG. 40 shows a training device with anatomically configured pieces to align the training device with the sides of a sportsperson's head;

FIG. 41 shows a training device with flexible side pieces;

FIG. 42 shows a perspective view of a training device with adjustable side pieces and a head support with an opening;

FIG. 43 shows the training device of FIG. 42 from top plan view;

FIG. 44 shows various aspects of a training device with adapter pieces for the head support;

FIG. 45 shows a training device with a broad head support;

FIG. 46 shows a training device with an adjustable tailpiece;

FIG. 47 shows a training device with a folding adjustable tailpiece;

FIG. 48 shows a training device with a broad head support and wide opening;

FIG. 49 shows a training device with a vertically oriented head support;

FIG. 50 shows a training device with a removable tip for the tailpiece;

FIG. 51 shows the training device of FIG. 50 in a top plan view;

FIG. 52 shows an adjustable and detachable head support piece for a training device according to the invention;

FIG. 53 shows an oblique perspective view of an integrated goggles and training device of the invention;

FIG. 54 shows the training device of FIG. 53 in a side-view as worn by a sportsperson;

FIG. 55 shows an integrated goggle and training device of the invention;

FIG. 56 shows a training device with a head support featuring two prongs of support;

FIG. 57 shows a training device with multiple positions for the tailpiece;

FIG. 58 shows a sliding adjustable tailpiece of a training device according to the invention;

FIG. 59 shows replaceable tailpieces varying by length according to the invention;

FIG. 60 shows a training device in perspective worn on a sportsperson;

FIG. 61 shows the training device with a strap mounting feature.

DESCRIPTION OF PREFERRED EXEMPLARY EMBODIMENTS

In accord with FIG. 1, a training device for sportspersons, according to the invention, which can be used by a sportsperson to train a correct succession of movement, comprises a head support 1 having a tailpiece 2.

In detail, the head support provides a strap mounting feature 3 that is equipped with a plurality of openings 4 for a head strap 5, and scalloped portion 6 of the head support to accommodate a hair bun or pony tail, the training device with respect to which the sportsperson wears in a corresponding position during the performance of a stroke, a swing, or other sport.

Figure 7:
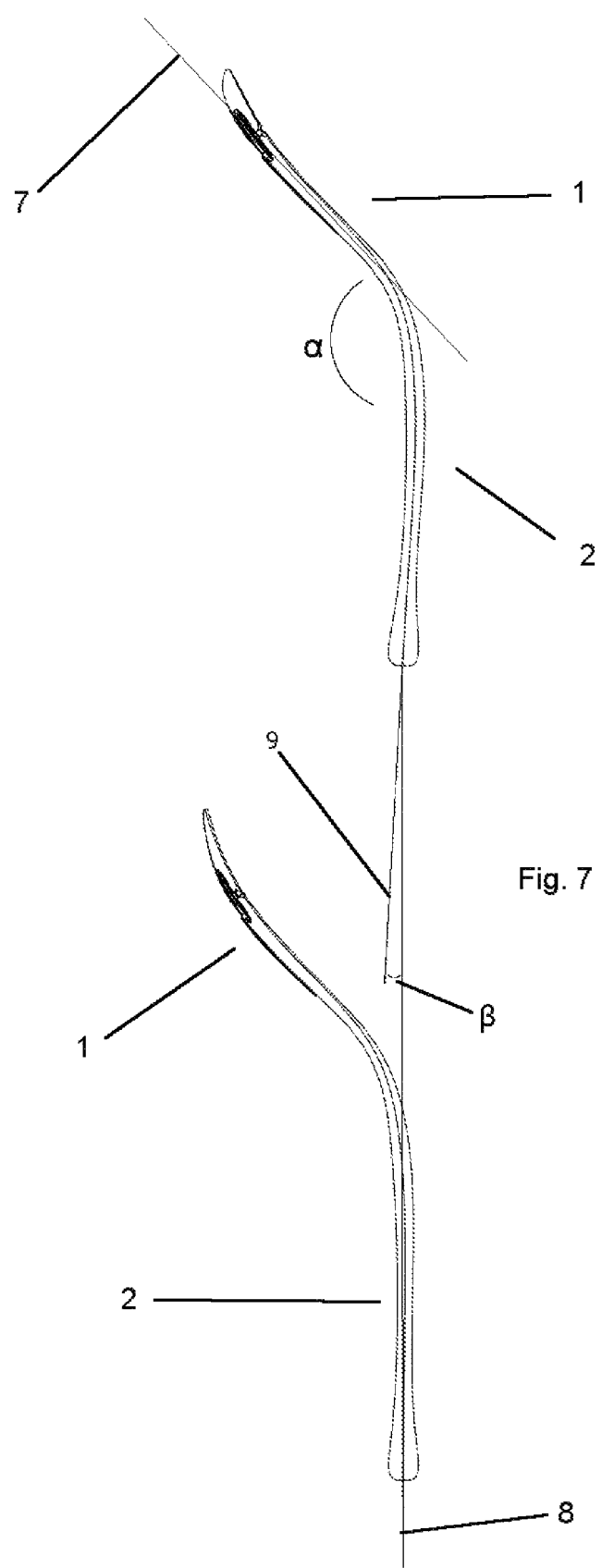
FIG. 7 shows a side view of the invention.

Furthermore, as shown in FIG. 2 the head support 1 and tailpiece 2 are provided at an angle which accommodates the sportsperson's activity. The angle of the tailpiece determines the degree of freedom the sportsperson has in performing a movement. The curvature of the training device in FIGS. 1 and 2 is defined by angle α and β, shown in FIG. 7. Advantageously the training devices of the invention may have an α angle from 270° to 45° depending on what is appropriate for the activity of the sportsperson. The α angle can be between 45° and 270°, advantageously between 90° and 180°, advantageously between 100° and 170°, advantageously between 120° and 150°, and advantageously between 137° and 140°. The α angle is most preferably approximately 137°. The β angle is defined as the difference of the angle of the training device tailpiece centerline 9 as compared to a tailpiece 2 with an α of 140°. The β angle can be between −90° and 90°, advantageously between −70° and 70°, and advantageously between −50° and 50°, advantageously between −30° and 30°, advantageously between −20° and 20°, advantageously between −10° and 10°, advantageously between −5° and 5°, and advantageously between −3° and 3°, and most preferably 3°.

More in detail, the invention provides for alignment of the head support and tailpiece. Most activities require the training device to be worn on the head so that it is evenly positioned relative to the trainee's head, neck and shoulders, requiring proper registration of position. There are several ways to achieve a correct registration of the position of the head support 1 and tailpiece 2. FIG. 6 depicts a strap 5 for use with a head support 1 held in place by strap mounting features 3. The trainee can align the head support and tailpiece on their head by feeling where the buckles 10, as shown in FIG. 3, are positioned on their head.

The combination of the body's own exteroception and proprioception gives a trainee the ability to feel when something is evenly held relative to the other parts of their body. Advantageously, the buckles 10 of head strap 6 provide a key for proper registration, as well as making it convenient to attach and detach the training device from the strap of swimming goggles.

In accord with FIG. 8, the head registration of the training device may be facilitated by bumps or raised portions 11 of the strap 5.

In addition or alternatively the invention as in FIG. 8 through 12 may be composed of a head support and tailpiece inserted into a strap with a special head strap pocket 12 to accommodate the device.

Figure 13:
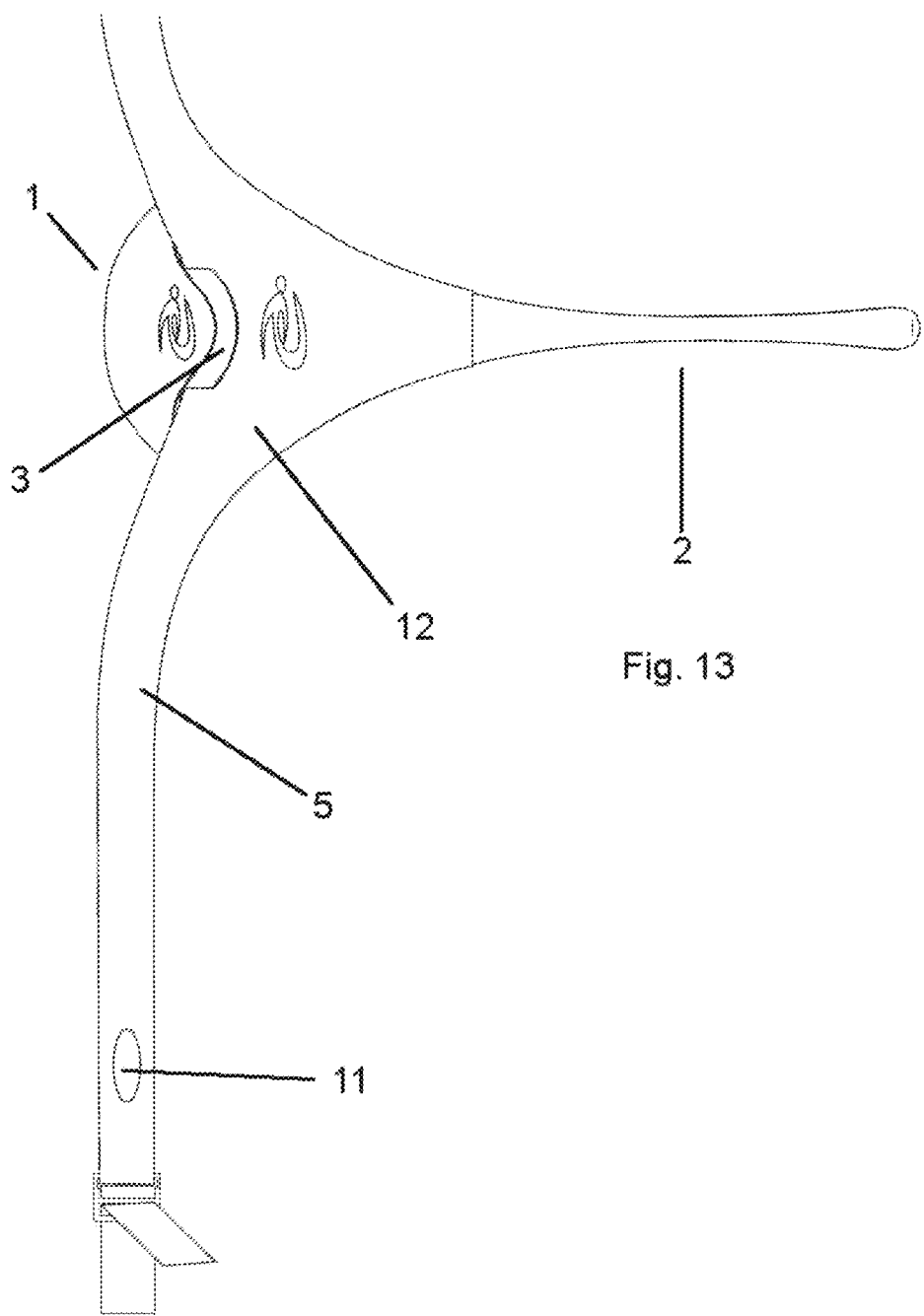
FIG. 13 shows a training device of the invention with a pocket head strap for inserting the head support and tailpiece.
Figure 14:
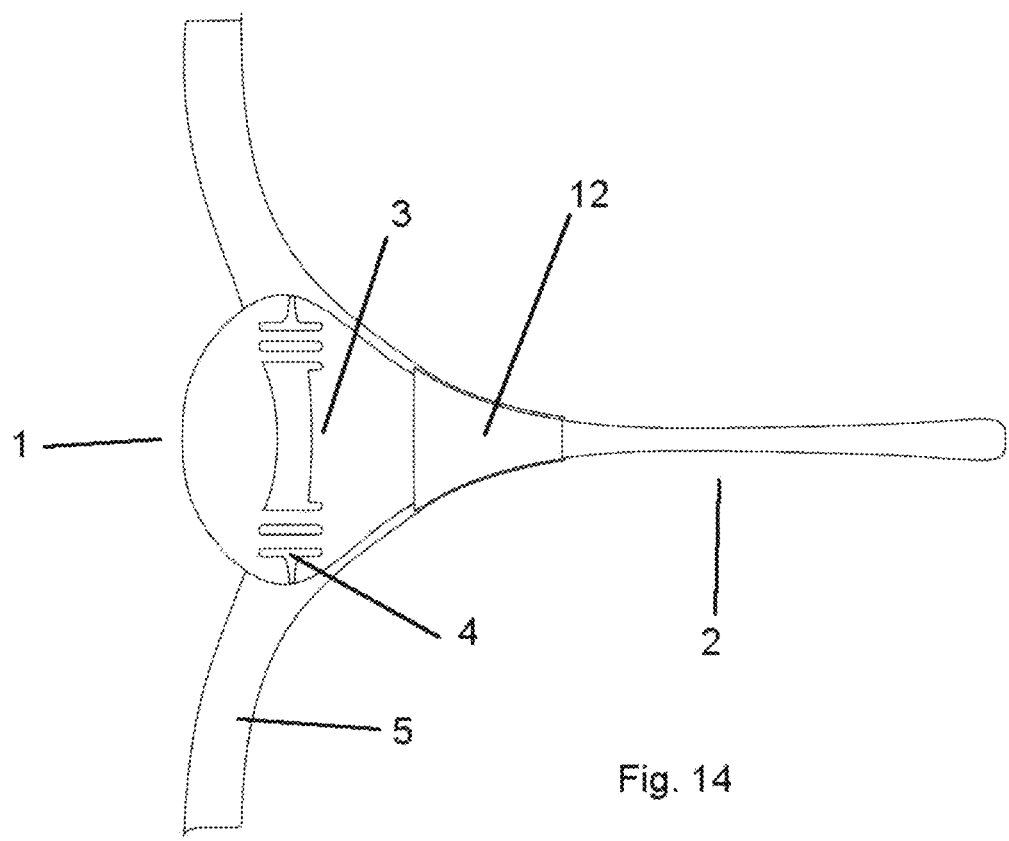
FIG. 14 shows the underside of a training device as in FIG. 13.

A further variation of the invention allows for the head support 1 and tailpiece 2 element to be detachable from the head strap 5 as in FIG. 13 and FIG. 14. The advantage of the removable head support 1 and tailpiece 2 allows the trainee to use tailpieces of different lengths or head supports of different shapes. Furthermore, the head strap pocket 12 version of the head strap 5 provides enhanced registration of the device for alignment on the head.

Figures 15, 16:
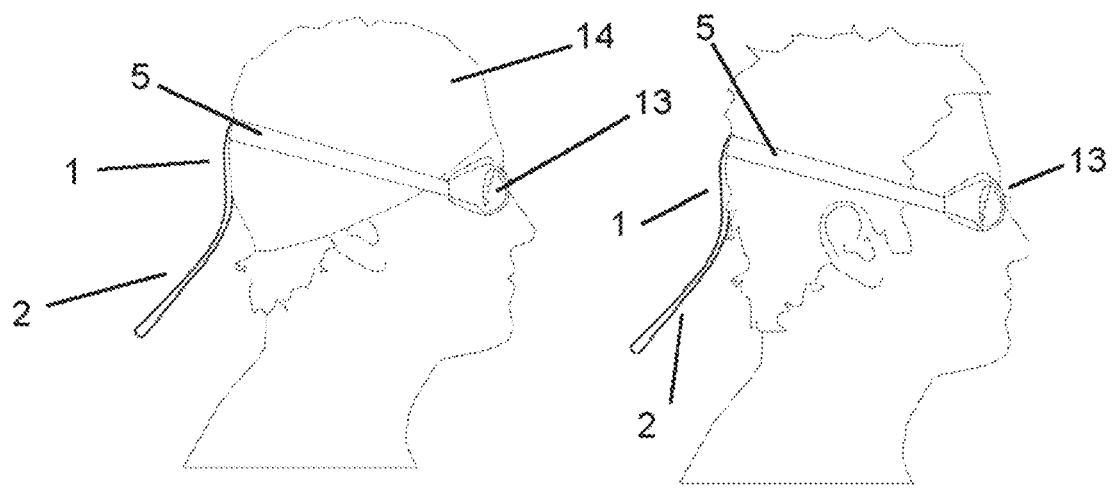
Figures 17, 18:
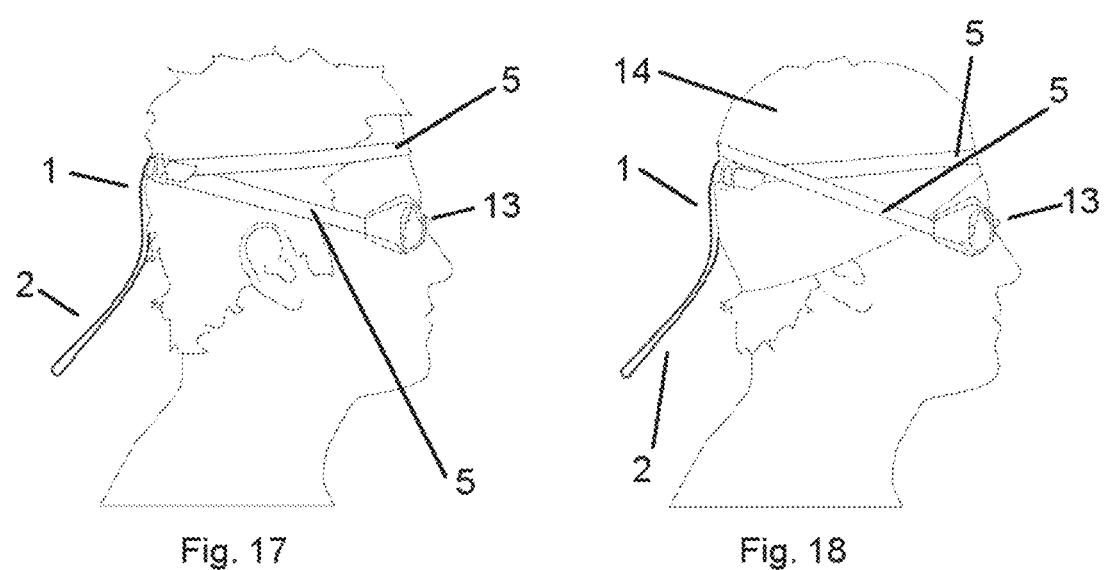

In addition, FIG. 15 through FIG. 18 show a profile view of various configurations of the invention used with swimming goggles 13. As in FIG. 18 the training device uses a discreet head strap 5 criss-crossed underneath the strap from the swimming goggles 13. FIG. 17 shows the head strap of the training device and swimming goggles head strap where the training device head strap is on top of and overlapping the head strap for the swimming goggles. While in FIG. 16, the training device uses the same head strap as the swimming goggles, and FIG. 15 shows the same with a swimming cap in place.

In particular, FIG. 19 shows the training device in a typical position for use by a swimmer. This arrangement is demonstrative and is not meant to limit the possible uses of the training device. The head support 1 is held to the trainee by head strap 5 high enough on the back of the head that it allows the tailpiece 2 to clear the shoulders when the trainee turns their head to the side to breath while still keeping the tip of the tailpiece proximate to the shoulder blades so that if the trainee inadvertently lifts his head the tailpiece will contact between the shoulder blades, providing a stimulus for the trainee to correct their head posture.

In one embodiment, as in FIG. 20 the invention features a head strap with ear registration pieces for accurate alignment of the training device.

In addition, or alternatively, FIG. 21 and FIG. 22 show the training device worn with a swimmers cap. In FIG. 22, the training device has registration points 11 on the strap. In FIG. 22 the training device is shown with a swimmer who has their hair in a bun. The training device fits under the hair bun while still being properly registered.

In addition or alternatively, FIG. 23 and FIG. 24 show two different ways the head strap 5 may be threaded through the strap mounting feature 3 and strap openings 4. In the first instance, the strap is threaded through the opening and then back along itself, while in second instance the strap is threaded though one side of the head support by the strap opening 4 and out the other side of the head support by another strap opening 4.

Furthermore, FIG. 25 shows a specially made swimming cap 14 where the tailpiece 2 extends through a swimming cap opening 15.

In a further exemplary embodiment of the invention, FIG. 26 shows the training device through strap mounting feature 3 co-mounted on the strap for swimming goggles 13.

In addition, or alternatively, FIG. 27 shows the training device may have a strap mounting feature 3 with two halves that capture the strap in between. While in FIG. 27 the strap mounting feature 3 is a small strap that locks the head strap 5 into place.

In particular, FIG. 28 shows the placement of a head support 1 with tailpiece 2 into the head strap pocket 12. Tailpieces of different lengths can be used to accommodate different trainees or a trainee's particular skill level.

In further exemplary embodiments, FIG. 29 to FIG. 32 show different embodiments of the invention using a head strap with a pocket to accommodate the head support and tailpiece of the invention.

More in detail, FIG. 33 shows an advantage of the invention with a head strap featuring earpiece registration 11 and a head strap pocket 12 for receiving the head support 1 and tailpiece 2.

In addition, the training device of FIG. 34 may advantageously have adjustable earpieces for registration 11.

Further embodiments of the invention in FIG. 35 advantageously have a strap mounting feature that is integrated with the head support as well as a point for exteroception head registration. FIG. 36 shows a training device of the invention with integrated head strap as used by a trainee.

While in FIGS. 37, 38 and 40 the invention features an opening or scalloped section to accommodate a hair bun or pony tail, as well as having the advantage of allowing proper head registration. FIG. 39 features an embodiment of the invention that has an elongated head support 1.

In addition, FIG. 41 shows a further embodiment of the invention, the head support 1, head strap mounting feature 3 for mounting a strap and registration points 11.

In a still further embodiment of the invention, FIGS. 42 and 43 have adjustable registration pieces 11 that center the device on the ears of the trainee. The earpieces extend by sliding from the head support 1.

Furthermore, the head support 1 of the invention may feature additional support pieces to accommodate a trainee's head (FIG. 44). While in FIG. 45 the head support 1 is especially wide to provide lateral support with integrated strap mounting features 3. Similarly, FIG. 46 features a version of the invention with an adjustable tailpiece tip 16. Similarly as in FIG. 47 an exemplary embodiment has a tailpiece tip 16 that adjust by folding.

In addition, the invention as in FIGS. 48 and 49 feature an extended head piece that provides increased stability, proper registration, and an opening for long hair.

A further embodiment provides for replaceable tailpiece tips 16, FIGS. 50 and 51, allow for a variety of lengths or a combination of materials to be used.

Further still, the head support piece 1 may lock into place on a head strap 5 by a locking means, such as in FIG. 52.

The invention is further illustrated by exemplary embodiment depicted in FIGS. 53 and 54 with an integrated design with swimming goggles 13 the features of which include a head support 1 tailpiece 2 and head strap 5.

Integrated goggles with the invention is further illustrated in FIG. 55, hear the head support piece is blended with the head strap to form a single integrated unit that also supports the tailpiece 1.

Furthermore the head support may have multiple prongs extending from the head support to provide increased stability and ability to properly register the device, as in FIG. 56.

As shown in FIG. 57, the training device in one embodiment has a tailpiece with the advantage of adjustable angles. The angle can be adjusted for novice, intermediate, or expert ability. The novice will wear the tail piece at a higher angle, away from the shoulders, while an expert will have the tailpiece at a larger α angle.

In FIG. 59 the training device has an adjustable tailpiece by replacing the tailpiece with different length tailpieces 16.

In FIG. 58 the training device has an adjustable tailpiece that adjusts by sliding; while in FIG. 60 the tailpiece is replaceable and allows for different lengths.

Further still, an embodiment of the invention as shown in FIG. 60 and FIG. 61 shows the training device accommodates a hair bun.

While in FIG. 61 the strap mounting feature 3 is a small strap that locks the head strap 5 into place.

The foregoing description of a specific embodiment will so fully reveal the invention according to a conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

What is claimed is:

1. A training device comprising of a head support piece with a top and a bottom edge, and a tailpiece extending from the bottom edge of said head support, and a head strap detachably secured to the head support, said training device further comprising said tailpiece having an α angle of 137° and a β angle of 3°, and said training device is 6.770 inches long from the tip of the tailpiece to the top of the head support and 2.372 inches wide at the widest part of the head support.

* * * * *